US008339384B2

(12) United States Patent
Takei et al.

(10) Patent No.: US 8,339,384 B2
(45) Date of Patent: Dec. 25, 2012

(54) DISPLAY DRIVING APPARATUS, DISPLAY APPARATUS AND DRIVE CONTROL METHOD FOR DISPLAY APPARATUS

(75) Inventors: Manabu Takei, Sagamihara (JP); Jun Ogura, Fussa (JP); Shunji Kashiyama, Sagamihara (JP); Tsuyoshi Ozaki, Fuchu (JP)

(73) Assignee: Casio Computer Co., Ltd., Tokyo (JP)

( * ) Notice: Subject to any disclaimer, the term of this patent is extended or adjusted under 35 U.S.C. 154(b) by 627 days.

(21) Appl. No.: 12/569,322

(22) Filed: Sep. 29, 2009

(65) Prior Publication Data

US 2010/0079423 A1 Apr. 1, 2010

(30) Foreign Application Priority Data

Sep. 29, 2008 (JP) ................................. 2008-251908

(51) Int. Cl.
*G06F 3/038* (2006.01)

(52) U.S. Cl. ........................... 345/205; 345/214; 345/84

(58) Field of Classification Search ........................ None
See application file for complete search history.

(56) References Cited

U.S. PATENT DOCUMENTS

| | | | |
|---|---|---|---|
| 7,760,168 | B2 | 7/2010 | Ogura |
| 2003/0057895 | A1 | 3/2003 | Kimura |
| 2005/0219168 | A1 | 10/2005 | Shirasaki et al. |
| 2006/0221015 | A1 | 10/2006 | Shirasaki et al. |
| 2008/0111773 | A1 | 5/2008 | Tsuge |
| 2008/0111812 | A1 | 5/2008 | Shirasaki et al. |

FOREIGN PATENT DOCUMENTS

| | | | |
|---|---|---|---|
| EP | 0 905 673 | A1 | 3/1999 |
| JP | 2003-271095 | A | 9/2003 |
| JP | 2006-146257 | A | 6/2006 |
| JP | 2006-301250 | A | 11/2006 |
| JP | 2008-052289 | A | 3/2008 |
| JP | 2008-107774 | A | 5/2008 |
| JP | 2008-139861 | A | 6/2008 |

OTHER PUBLICATIONS

Japanese Office Action dated Jan. 31, 2012 (and English translation thereof) in counterpart Japanese Application No. 2008-251908.
International Search Report and Written Opinion of the International Searching Authority dated Dec. 22, 2009 (13 pages), issued in counterpart International Application No. PCT/JP2009/067291.

*Primary Examiner* — Muhammad N Edun
(74) *Attorney, Agent, or Firm* — Holtz, Holtz, Goodman & Chick, PC

(57) ABSTRACT

A data acquisition circuit sets one of the potential value at one end of a signal line and the value of a current flown thereto when one end of a current path of a drive device is connected to a light emitting device with the other end thereof set to a potential value where no current flows to the light emitting device. Then the circuit causes current to flow via the current path and the signal line and acquires one of the value of the current flown to the signal line and the potential value at the one end of the signal line according to the set value. A correction operation circuit acquires a threshold voltage and a current amplification factor of the drive device based on one of the current and potential values thus acquired as well as on one of the potential and current values thus set.

18 Claims, 13 Drawing Sheets

Vl_0: Vth = Vth0 (INITIAL VALUE), β = β0 (STANDARD VALUE)

Vl_1: Vth = Vth0 + ΔVth, β = β0

Vl_2: Vth = Vth0, β = β0 + Δβ

Vl_3: Vth = Vth0, β = β0 − Δβ

DISPLAY DRIVING APPARATUS, DISPLAY APPARATUS AND DRIVE CONTROL METHOD FOR DISPLAY APPARATUS

BACKGROUND OF THE INVENTION

1. Field of the Invention

The present invention relates to a display driving apparatus, a display apparatus having the display driving apparatus, and a drive control method for the display apparatus.

2. Description of the Related Art

An organic EL (Electro-Luminescence) device is a light emitting device that has a fluorescent or phosphorous organic compound which is excited by application of an electric field, and emits light according to the applied current.

Light emitting devices of this kind have been drawing attention as next generation display devices. The organic EL or other devices are used in a pixel, and a display apparatus based on a matrix of such pixels have been a subject of ongoing research and development.

The organic EL device is a current drive device, and emits light with a luminance proportional to the flowing current. A display apparatus having such organic EL devices has a drive transistor formed by a field effect transistor (thin film transistor) at each pixel. The drive transistor controls the current value of the current to be supplied to the organic EL device according to the voltage applied to the gate of the transistor.

At each pixel, a capacitor is connected between the gate and source of the drive transistor. A voltage corresponding to a video signal externally supplied is written in the capacitor which holds the voltage.

When a voltage is applied between the drain and source of the drive transistor, the drive transistor supplies the current to the organic EL device while controlling the current value with the voltage held by the capacitor treated as a gate-source voltage (hereinafter called "gate voltage") Vgs.

The current value of the current supplied to the organic EL device from the drive transistor is determined according to the value of the gate voltage Vgs and the characteristic values of the drive transistor (threshold voltage Vth and current amplification factor $\beta$).

It is known that the threshold voltage Vth varies due to the drive history or the like of the pixels. When the threshold voltage Vth is changed by the drive history or the like, the luminance of the organic EL device varies even with the same gate voltage Vgs. This degrades the display quality.

Therefore, aiming at improving the display quality, now underway is the development of display devices with pixels using organic EL or other light emitting devices, in which the value of the threshold voltage Vth of each pixel is obtained and the obtained value is used to correct the value of the voltage to be applied between the gate and source of the drive transistor in accordance with a video signal.

While the current amplification factor $\beta$ is not changed much by the drive history, it may vary among pixels due to, for example, the fabrication process factor.

With a variation in current amplification factor $\beta$ between pixels, degrading of the display quality originating from the variation in current amplification factor $\beta$ between pixels is not overcome even if the voltage value of the voltage to be applied between the gate and source of the drive transistor is corrected with the acquired value of the threshold voltage Vth of each pixel.

SUMMARY OF THE INVENTION

The present invention has an advantage of providing a display driving apparatus capable of suppressing reduction in display quality originating from a variation in the threshold voltage of each pixel and a variation in the current amplification factor of each pixel, a display apparatus having the display driving apparatus, and a drive control method for the display apparatus.

To obtain the advantage, according to the invention, there is provided a display driving apparatus for driving a pixel having a light emitting device and a drive device whose current path having one end connected to the light emitting device, via a signal line, comprising a data acquisition circuit that is connected to one end of the signal line, causes, by setting either one of the value of the potential at the one end of the signal line and the current value of the current to be flown to the signal line, a current to flow through the current path of the drive device and the signal line with a potential at an other end of the current path of the drive device being set so as not to cause the current to flow to the light emitting device, and acquires, in accordance with the set value, either one of a current value of that current flowing to the signal line and a value of a potential at the one end of the signal line, and a correction operation circuit that acquires a threshold voltage and a current amplification factor of the drive device based on the acquired one of the current value and the value of the potential which are acquired by the data acquisition circuit and the set one of the value of the potential and the current value.

To obtain the advantage, according to the invention, there is provided a display apparatus for displaying image information, comprising a plurality of pixels each having a light emitting device and a drive device whose current path having one end connected to the light emitting device, a plurality of signal lines respectively connected to the plurality of pixels, a data acquisition circuit that is connected to one ends of the signal lines which are not connected to the respective pixels, causes, by setting either one of the value of the potential at the one end of the each signal line and the current value of the current to be flown to the each signal line, a current to flow through the current path of the drive device of each pixel and each signal line with a potential at an other end of the current path of the drive device of the each pixel being set so as not to cause the current to flow to the light emitting device, and acquires, in accordance with the set value, either one of a current value of that current flowing to the each signal line and a value of a potential at the one end of the each signal line, and a correction operation circuit that acquires a threshold voltage and a current amplification factor of the drive device of the each pixel based on the acquired one of the current value and the value of the potential which are acquired by the data acquisition circuit and the set one of the value of the potential and the current value.

To obtain the advantage, according to the invention, there is provided a drive control method for a display apparatus for displaying image information, the display apparatus including a plurality of pixels each having a light emitting device and a drive device whose current path having one end connected to the light emitting device, and a plurality of signal lines respectively connected to the plurality of pixels, the method comprising a measurement value acquiring step of setting a potential at an other end of the current path of the drive device of the each pixel so as not to cause, by setting either one of the value of the potential at the one end of the each signal line and the current value of the current to be flown to the each signal line, the current to flow to the light emitting device, causing a current to flow through the current path of the drive device of each pixel and each signal line, and acquiring, in accordance with the set value, either one of a current value of that current flowing to the each signal line and a value of a potential at the one end of the each signal line, and a characteristic value acquiring step of acquiring a threshold voltage and a current amplification factor of the drive device of the each pixel based on the acquired one of the current value and the value of the potential which are acquired and the set one of the value of the potential and the current value.

BRIEF DESCRIPTION OF THE DRAWINGS

FIG. 7 is a timing chart illustrating a measuring operation which is executed at the time of factory shipment or the like;

FIG. 8 is a diagram illustrating the flows of currents in the measuring operation which is executed at the time of factory shipment or the like;

DETAILED DESCRIPTION OF THE PREFERRED EMBODIMENT

One embodiment of a display driving apparatus according to the present invention, a display apparatus having the display driving apparatus, and a drive control method for the display apparatus will now be described with reference to the accompanying drawings.

Figure 1:
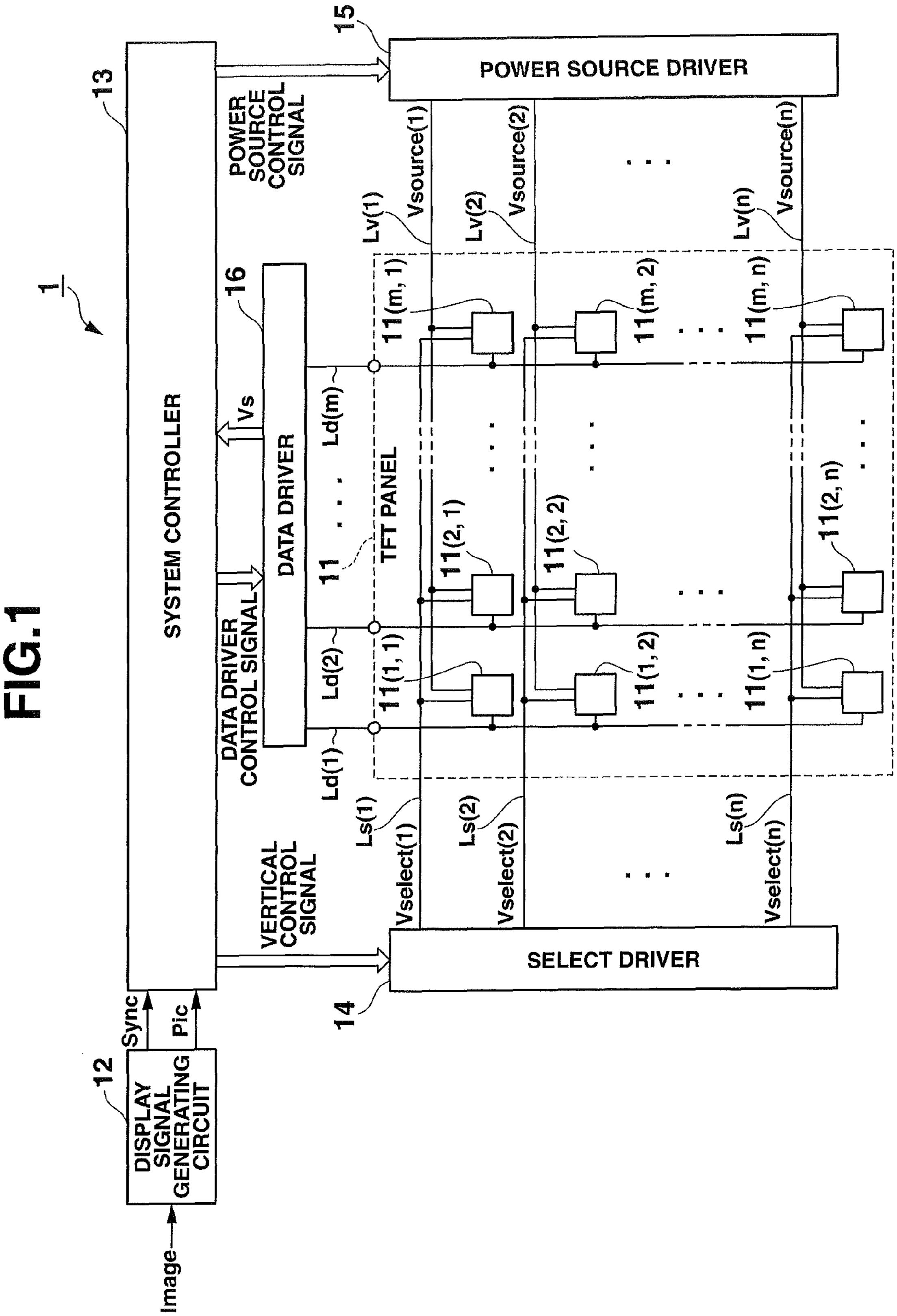
FIG. 1 is a block diagram showing the configuration of a display apparatus according to an embodiment of the present invention.

FIG. 1 is a block diagram showing the configuration of a display apparatus according to the embodiment.

Figure 2:
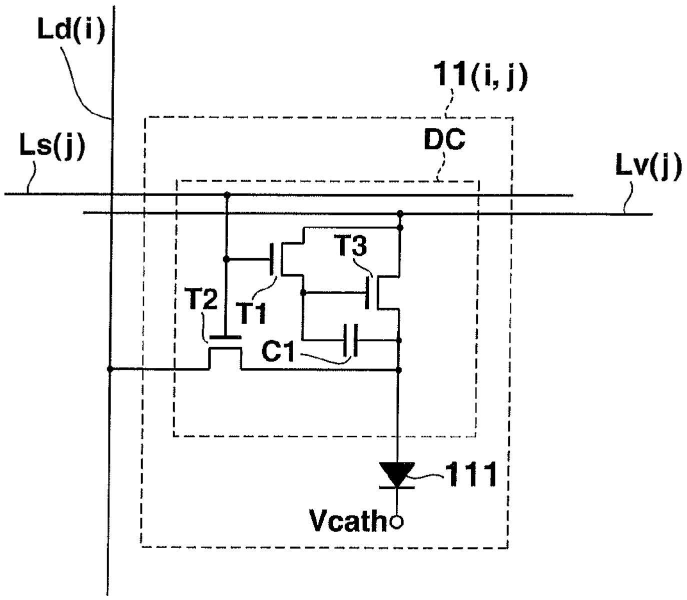
FIG. 2 is a diagram showing the structure of a pixel shown in FIG. 1.

FIG. 2 is a diagram showing the structure of a pixel shown in FIG. 1.

A display apparatus 1 according to the embodiment includes a TFT panel 11, a display signal generating circuit 12, a system controller 13, a select driver 14, a power source driver 15, and a data driver 16 as shown in FIG. 1.

The TFT panel 11 has a plurality of pixels 11(*i,j*) (i=1 to m, j=1 to n; m, n: natural numbers).

The individual pixels 11(*i,j*) each correspond to one pixel of an image, and are arranged two-dimensionally in a matrix form. As shown in FIG. 2, each pixel 11(*i,j*) has an organic EL device 111 as a light emitting device, transistors T1 to T3, and a capacitor C1.

The transistors T1 to T3 and the capacitor C1 form a pixel drive circuit DC.

The organic EL device 111 is a display device that emits light using the phenomenon of light emission caused by excitons produced by recombination of electrons injected into an organic compound and holes, and emits light with a luminance corresponding to the current value of the supplied current to display an image according to a video signal Image.

The organic EL device 111 has a pixel electrode formed therein, and has a hole injection layer, an emission layer and an opposing electrode formed on the pixel electrode. The hole injection layer, formed on the pixel electrode, has a capability of supplying holes to the emission layer. The pixel electrode generally serves as the anode (electrode) of the organic EL device 111.

When the organic EL device 111 has a bottom emission structure, the pixel electrode is formed of a translucent conductive material, such as ITO (Indium Tin Oxide) or ZnO. Each pixel electrode is insulated from the pixel electrode of another adjoining pixel by an interlayer insulating film.

The hole injection layer is made of a organic polymer group material which ensure hole injection and hole transport. As an organic compound containing liquid containing a organic polymer hole injection/transport material, for example, a PEDOT/PSS solution or a dispersion prepared by dispersing polyethylenedioxythiophene (PEDOT) which is a conductive polymer and polystyrene sulfonate (PSS) which is a dopant into an aqueous solvent is used.

The emission layer is formed on the interlayer. The emission layer has a capability of emitting light with a predetermined voltage applied between the anode electrode and cathode electrode.

The emission layer is formed of a publicly-known polymeric emission material capable of emitting fluorescent or phosphorous light, such as red (R), green (G) and blue (B) emission materials containing polyphenylene vinylene or polyfluorene conjugated double bond polymer.

Those emission materials are adequately dissolved (or dispersed) into an aqueous solvent or an organic solvent, such as tetralin, tetramethyl benzene, mesitylene or xylene, to prepare a solution (fluid dispersion) which is in turn applied to the interlayer by nozzle coating, ink-jet printing or the like and volatilize the solvent.

When the organic EL device 111 has the bottom emission structure, the opposing electrode has a double layer structure having a layer of a conductive material with a low work function, such as Ca or Ba, and a light reflecting conductive layer of Al or the like. The opposing electrode generally serves as the cathode (electrode) of the organic EL device 111.

The current flows in the direction from the pixel electrode (anode) to the opposing electrode (cathode), and does not counterflow. A cathode voltage Vcath is applied to the cathode comprised of the opposing electrode.

Each of the transistors T1 to T3 in the pixel drive circuit DC is a TFT comprised of an n channel FET (Field Effect Transistor), and is made of amorphous silicon or polysilicon.

Each of the transistors T1 to T3 has a gate (terminal), a drain (terminal), and a source (terminal), and has a current path formed between the drain and source.

The transistor T3 is a drive transistor (drive device) which controls the current value of the current to be supplied to the organic EL device 111.

The drain of the transistor T3 of each pixel 11(*i,j*) serving as the upstream end of the current path is connected to a voltage line Lv(j), and the source of the transistor T3 serving as the downstream end of the current path is connected to the anode of the organic EL device 111.

Then, the transistor T3 supplies the organic EL device 111 with the current having a current value corresponding to the gate voltage Vgs as a control voltage.

The transistor T1 is a switch transistor (switch device) for connecting or disconnecting the gate and drain of the transistor T3 together or from each other.

The drain of the transistor T1 of each pixel 11(*i,j*) is connected to the voltage line Lv(j) (drain of the transistor T3), and the source thereof is connected to the gate of the transistor T3 serving as a control end.

The gate of the transistor T1 of each of the pixels 11(1,1) to 11(*m*,1) is connected to a select line Ls(1). Likewise, the gate of the transistor T1 of each of the pixels 11(1,2) to 11(*m*,2) is connected to a select line Ls(2), and so forth, and the gate of the transistor T1 of each of the pixels 11(1,*n*) to 11(*m*,*n*) is connected to a select line Ls(n).

For the pixel 11(1,1), when an Hi (High) level signal is output onto the select line Ls(1) from the select driver 14, the transistor T1 is turned on, and the transistor T3 has the gate and drain connected together, providing a diode connection state.

When a Lo (Low) level signal is output to the select line Ls(1), the transistor T1 is turned off.

The transistor T2 is a switch transistor (switch device) which is selectively turned on or off by the select driver 14 to connect or disconnect the source of the transistor T3 and the anode of the organic EL device 111 to or from the data line Ld(i).

The drain of the transistor T2 of each pixel 11(*i,j*) is connected to the source of the transistor T3 and the anode of the organic EL device 111.

The gate of the transistor T2 of each of the pixels 11(1,1) to 11(*m*,1) is connected to the select line Ls(1). Likewise, the gate of the transistor T2 of each of the pixels 11(1,2) to 11(*m*,2) is connected to the select line Ls(2), and so forth, and the gate of the transistor T2 of each of the pixels 11(1,*n*) to 11(*m,n*) is connected to the select line Ls(n).

The source of the transistor T2 of each of the pixels 11(1,1) to 11(1,*n*) which serves as the other end of the current path is connected to a data line Ld(1). Likewise, the source of the transistor T2 of each of the pixels 11(2,1) to 11(2,*n*) is connected to a data line Ld(2), and so forth, and the source of the transistor T2 of each of the pixels 11(*m*,1) to 11(*m,n*) is connected to a data line Ld(m).

For the pixel 11(1,1), when the Hi level signal is output onto the select line Ls(1) from the select driver 14, the transistor T2 is turned on, connecting the anode of the organic EL device 111 to the data line Ld(1).

When the Lo level signal is output to the select line Ls(1), the transistor T2 is turned off, disconnecting the anode of the organic EL device 111 from the data line Ld(1).

The capacitor C1 is a capacitive component which holds the gate voltage Vgs of the transistor T3, and has one end connected to the source of the transistor T1 and the gate of the transistor T3, and the other end connected to the source of the transistor T3 and the anode of the organic EL device 111.

When the drain current Id flows toward the drain of the transistor T2 from the voltage line Lv(j) via the current path of the transistor T3, the transistor T3 is turned on. At this time, the capacitor C1 is charged with the gate voltage Vgs of the transistor T3 to store the charges.

When the transistors T1 and T2 are turned off, the capacitor C1 holds the gate voltage Vgs of the transistor T3.

Returning to FIG. 1, the display signal generating circuit 12 is externally supplied with a video signal Image, such as a composite video signal or a component video signal.

The display signal generating circuit 12 acquires display data Pic like a luminance signal and a sync signal Sync from the supplied video signal Image. The display signal generating circuit 12 supplies the acquired display data Pic and sync signal Sync to the system controller 13.

The system controller 13 controls correction of the display data Pic, the writing operation and the emission operation. The power source driver 15 applies a voltage Vsource(j) having a predetermined voltage value to the voltage line Lv(j).

The correction of the display data Pic is a process of correcting the display data Pic supplied from the display signal generating circuit 12 based on the value of a threshold voltage Vth and the value of a current amplification factor β of the drive transistor (transistor T3) of each pixel 11(*i,j*) to generate a corrected gradation signal.

The writing operation is an operation of writing a voltage corresponding to the generated gradation signal in the capacitor C1 of each pixel 11(*i,j*).

The emission operation is an operation of supplying a current corresponding to the voltage held in the capacitor C1 to the organic EL device 111 to cause the organic EL device 111 to emit light.

In the writing operation, which will be described in detail later, with the transistor T3 set in a diode connection state by the Hi level signal output onto the select line Ls(j), a voltage Vsource(j) having the same potential as the cathode voltage Vcath is applied to the voltage line Lv(j). Then, a voltage signal (drive signal) Vsig is applied to one end of the data line Ld(i).

At this time, the drain current flowing between the drain and source of the transistor T3 is given by the following equation 1

$$Id=\beta x(V\text{sig}-Vth)^2 \quad (1)$$

where Vth is the threshold voltage of the transistor T3 and β is the current amplification factor thereof.

Figure 3:
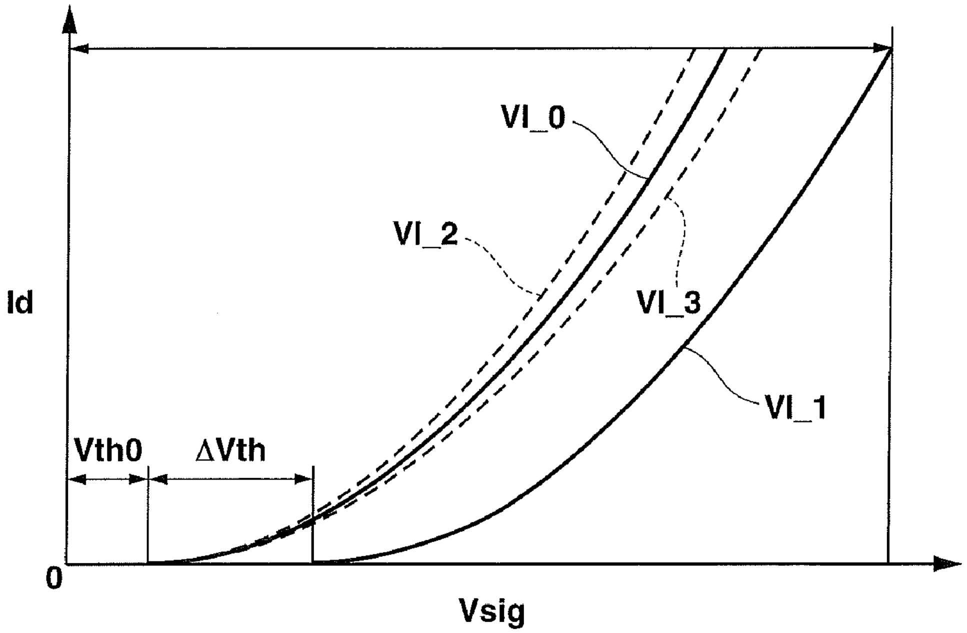
FIG. 3 is a diagram illustrating the voltage-current characteristic in the write mode of a drive transistor shown in FIG. 2.

FIG. 3 illustrates a change in the drain current Id with respect to the voltage signal (drive signal) Vsig to be applied between the gate and source (i.e., between the drain and source) of the transistor T3 in write mode.

The drain current Id according to the equation 1 flows between the source and drain of the transistor T3.

A characteristic VI_0 shown in FIG. 3 shows the initial voltage-current characteristic when the threshold voltage Vth is an initial value Vth0 and β is standard value β0 when the transistor T3 has the initial characteristic, such as at the time of factory shipment. A characteristic VI_1 shows the voltage-current characteristic when the threshold voltage Vth increases from the initial value Vth0 by ΔVth.

A characteristic VI_2 shows the voltage-current characteristic when β is larger than the standard value β0 by Aβ. A characteristic VI_3 shows the voltage-current characteristic when β is smaller than the standard value β0 by Aβ.

The transistor T3 of each pixel 11(*i,j*), particularly when comprised of an amorphous silicon TFT, has a relatively large time-dependent change in the characteristic caused by the flow of the drain current Id, so that the threshold voltage Vth gradually shifts (increases) with the time.

When the threshold voltage Vth shifts by ΔVth, the voltage-current characteristic of the transistor T3 changes to the characteristic VI_1 from the initial characteristic VI_0.

While the current amplification factor β hardly changes with the time, it varies among each pixel (i,j) due to, for example, the fabrication process factor.

When the current amplification factor β has a value (β0+Δβ) which is greater than the standard value β0 by Δβ, the voltage-current characteristic of the transistor T3 becomes the characteristic VI_2.

When the current amplification factor β has a value (β0−Δβ) which is smaller than the standard value β0 by Δβ, the voltage-current characteristic of the transistor T3 becomes the characteristic VI_3.

As expressed in the equation 1, with the value of the voltage signal Vsig set, the value of the drain current Id is determined by the values of two variables (threshold voltage Vth and β). The values of the two variables can be acquired by measuring the current value of the drain current Id with respect to, for example, different voltage values of the voltage signal Vsig based on the equation 1 at least twice while changing the voltage value of the voltage signal Vsig.

Alternatively, the values of the two variables can also be acquired by executing an operation of supplying the drain current Id to each of the data lines Ld(1) to Ld(m) from a constant current source and measuring the then voltage value at one end of each of the data lines Ld(1) to Ld(m) at least twice while changing the current value of the drain current Id supplied.

In case where the values of the two variables are acquired by performing the measurement twice while changing the voltage value of the voltage signal Vsig, given that the voltage values of the voltage signal Vsig in the two measurements are V1 and V2, and the values of the drain current Id corresponding to the voltage values V1, V2 of the voltage signal Vsig are id1 and id2, β and the threshold voltage Vth are respectively given by the following equations 2 and 3.

$$\beta = \left\{ \frac{\sqrt{id2} - \sqrt{id1}}{V2 - V1} \right\} \tag{2}$$

$$Vth = \frac{V1 \times \sqrt{id2} - v2 \times \sqrt{id1}}{\sqrt{id2} - \sqrt{id1}} \tag{3}$$

Because a variation in β is considered not to change with the time, once β is determined, for example, at the time of factory shipment or the like before the actual use, β normally need not be acquired again. It is to be noted however that β may be measured again at an arbitrary timing in actual use as needed.

Meanwhile, because the threshold voltage Vth changes with the time, it needs to be measured, for example, every time the display apparatus 1 is activated or displays a video image in actual use, or at a regular timing or the like.

Accordingly, at the time of factory shipment or the like, if the measurement is carried out twice to acquire β and the threshold voltage Vth and the measurement is carried out once at the aforementioned timing in actual use, the then threshold voltage Vth can be acquired for the value of β is known.

The following describes commonly preferred display characteristic. A display characteristic is said to be preferable when it has such a gamma characteristic that the luminance L of the display is a power of γ (γ>1), not one that is proportional to the intensity Sig of the input signal supplied to the display that accords to the characteristic of vision of human.

The value γ is called gamma value; for example, γ=2. The gamma value is expressed by the following equation 4.

$$L = \mathrm{Sig}^{\gamma} \tag{4}$$

A description will now be given of a case where the display apparatus 1 using the organic EL device 111 is set to have the gamma characteristic (γ=2).

The luminance of the display corresponds to the emission luminance of the organic EL device 111, and is proportional to a current value Iel of the current flowing to the organic EL device 111. Accordingly, given that the input signal is a signal Vcode having a voltage value corresponding to the gradation value of display data Pic, the current value Iel of the current flowing to the organic EL device 111 and the signal Vcode need to have the relationship given by the following equation 5.

$$Iel = \beta m \times V\mathrm{code}^2 \tag{5}$$

where βm is the gain as a proportional coefficient.

As described above, the current flowing to the organic EL device 111 in each pixel 11(*i,j*) according to the embodiment in emission mode is equal to the drain current Id flowing to the transistor T3 in write mode. The drain current Id has the relation given by the equation 1 with respect to the voltage signal Vsig applied to the data line Ld(i).

The drain current Id of equation 1 is equal to the current Iel flowing to the organic EL device 111 given by the equation 5. This derives the following equation 6 as the relationship between the voltage signal Vsig and the signal Vcode.

$$Vsig = Vcode \times \sqrt{\frac{\beta m}{\beta}} + Vth \tag{6}$$

Correcting the voltage signal Vsig according to the equation 6 can allow the threshold voltage Vth and β to be compensated for and provide the desired display characteristic shown in equation (5).

Figure 4:
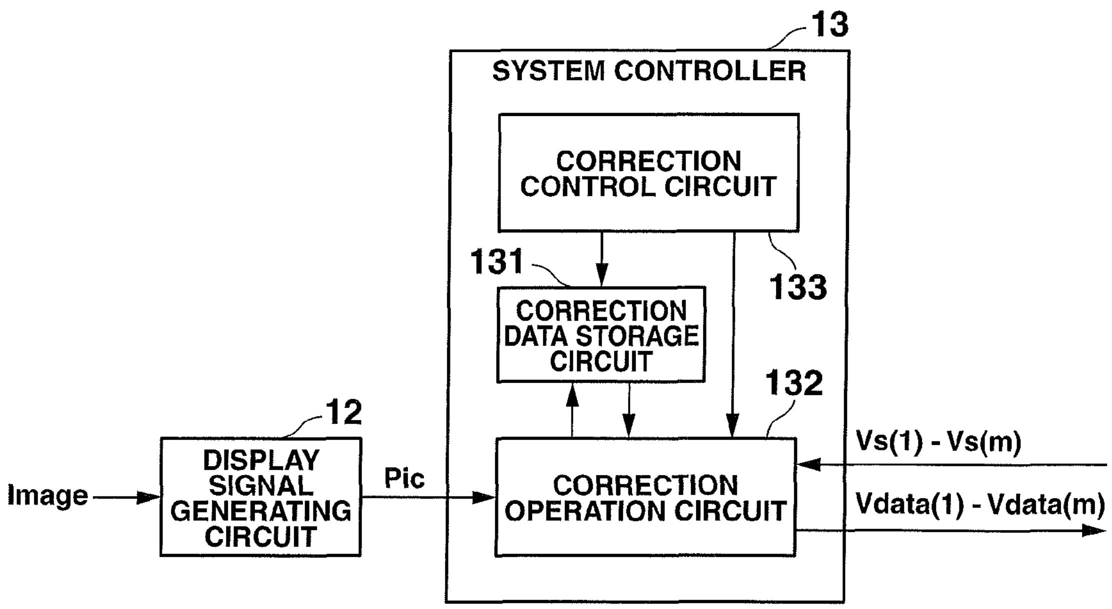
FIG. 4 is a diagram showing the configuration of a system controller shown in FIG. 1.

To perform such correction, the system controller 13 has a correction data storage circuit 131, a correction operation circuit 132 and a correction control circuit 133 as shown in FIG. 4.

The correction data storage circuit 131 stores display data Pic data supplied from the display signal generating circuit 12 and data relating to correction. When supplied with the display data Pic from the display signal generating circuit 12, the system controller 13 temporarily stores the display data Pic of each pixel 11(*i,j*) into the correction data storage circuit 131.

The correction operation circuit 132 acquires the threshold voltage Vth and β of the transistor T3 of each pixel 11(*i,j*) from the correction-related data stored in the correction data storage circuit 131. Then, the correction operation circuit 132 corrects the display data Pic read from the correction data storage circuit 131 using the acquired threshold voltage Vth and β. The correction operation circuit 132 generates and outputs corrected gradation signal Vdata(i).

The data driver 16 employs a force current/measure voltage system, for example, as a measuring method for acquiring the threshold voltage Vth and β. In the force current/measure voltage system, the data driver 16 draws a current i_sink(id1) with a current value id1 and a current i_sink(id2) with a current value id2 via the data lines Ld(1) to Ld(m) from the pixels 11(*i,j*) at the time of factory shipment or the like.

Then, potentials Vs(1) to Vs(m) at one ends of the data lines Ld(1) to Ld(m) at that time are measured.

The data driver 16 supplies the measured potentials Vs(1) to Vs(m) of the data lines Ld(1) to Ld(m) to the system controller 13. The current i_sink(id1), i_sink(id2) to be drawn becomes the drain current Id of the transistor T3.

The difference between each of the potentials Vs(1) to Vs(m) of the data lines Ld(1) to Ld(m) and the voltage Vsource(j) applied to each voltage line Lv(j), when the current i_sink(id1), i_sink(id2) is drawn from the transistor T3 at the selected line, is approximately equal to the application voltage to be applied between the drain and source (between the gate and source) of the transistor T3 at the selected line.

The application voltage becomes a drain voltage Vds (=gate voltage Vgs) of the transistor T3. The application voltages when the currents i_sink(id1), i_sink(id2) are drawn are voltages V1(1) to V1(*m*) and V2(1) to V2(*m*), respectively.

The correction operation circuit 132 acquires the voltages V1(1) to V1(*m*), V2(1) to V2(*m*) which are the differences between the potentials Vs(1) to Vs(m) of the data lines Ld(1) to Ld(m) supplied from the data driver 16, and the voltage of the signal Vsource(j). Then, the correction operation circuit 132 stores the current values of id1 and id2, and the voltages V1(1) to V1(*m*), V2(1) to V2(*m*) into the correction data storage circuit 131.

The correction operation circuit 132 assigns the current values id1, id2 and the voltages V1, V2 into the equations 2 and 3, respectively, where V1 and V2 are voltages applied to each pixel 11 (I,j) to acquire the current amplification factor β and the threshold voltage Vth.

The correction operation circuit 132 stores the acquired β and threshold voltage Vth as correction-related data into the correction data storage circuit 131 for each pixel 11(*i,j*).

Every time the display apparatus 1 is activated or displays a video image in actual use, or at a regular timing or the like, for example, the data driver 16 draws a current i_sink(id3) with a current value id3 from each pixel 11(*i,j*) via the data lines Ld(1) to Ld(m) to measure the potentials Vs(1) to Vs(m) of the data lines Ld(1) to Ld(m).

The potentials Vs(1) to Vs(m) of the data lines Ld(1) to Ld(m) when the current i_sink(id3) is drawn are supplied to the system controller 13 line by line.

The correction operation circuit 132 likewise acquires voltages V3(1) to V3(*m*) to be applied between the drain and source (between the gate and source) of the transistor T3 when the current i_sink(id3) is drawn, based on the potentials Vs(1) to Vs(m) of the data lines Ld(1) to Ld(m) supplied from the data driver 16 line by line and the voltage of the signal Vsource(j).

Given that the voltage to be applied to each pixel 11(*i,j*) pixel 11(*i,j*) is V3, the threshold voltage Vth is obtained from the following equation 7 which is a modified equation of the equation 1.

$$Vth = V3 - \sqrt{\frac{id3}{\beta}} \quad (7)$$

The correction operation circuit 132 assigns the current value id3 and the application voltage V3 to each pixel 11(*i,j*) into the equation 7 to acquire the threshold voltage Vth of the transistor T3 for each pixel 11(*i,j*).

The correction operation circuit 132 stores the acquired threshold voltage Vth as correction-related data into the correction data storage circuit 131 to update the value of the threshold voltage Vth acquired at the time of factory shipment or the like and stored in the correction data storage circuit 131.

The correction operation circuit 132 reads data relating to the equation 7 from the correction data storage circuit 131, and assigns the data into the equation 6 to generate and output gradation signal Vdata(i) obtained by correcting the display data Pic corresponding to each pixel 11(*i,j*).

The correction control circuit 133 controls the correction process of the display data Pic in the correction data storage circuit 131 and the correction operation circuit 132.

The system controller 13 performs such a correction process to control the writing operation and the emission operation.

To execute such control, the system controller 13 generates various control signals, such as a clock signal CLK and start signal Sp, supplies a vertical control signal to the select driver 14, supplies a power source control signal to the power source driver 15, and supplies a data driver control signal to the data driver 16.

It is to be noted that when the video signal Image is externally supplied, the system controller 13 synchronizes various control signals with the sync signal Sync supplied from the display signal generating circuit 12.

Returning to FIG. 1, the select driver 14 sequentially selects the lines of the TFT panel 11, and is comprised of a shift register, for example.

The select driver 14 is connected to the gates of the transistors T1, T2 of the individual pixels 11(*i,j*) via the select lines Ls(j) (j=1 to n), respectively.

The select driver 14 operates in synchronism with a start signal Sp1 synchronous with the vertical sync signal supplied as the vertical control signal from the system controller 13.

In accordance with a clock signal CLK1 supplied as the vertical control signal from the system controller 13, the select driver 14 outputs an Hi level select signal Vselect(j) to the pixels 11(1,1) to 11(*m*,1) of the first row, . . . , the pixels 11(1,*n*) to 11(*m,n*) of the nth row to sequential select the lines of the TFT panel 11.

The power source driver 15 outputs signals Vsource(1) to Vsource(n) with a voltage VL or voltage VH to voltage lines Lv(1) to Lv(n), respectively. The power source driver 15 is connected to the drains of the transistors T3 of the pixels 11(*i,j*) via the voltage lines Lv(j) (j=1 to n), respectively.

The power source driver 15 operates in synchronism with a start signal Sp2 synchronous with the vertical sync signal supplied as the power source control signal from the system controller 13 and in accordance with a clock signal CLK2 supplied as the power source control signal from the system controller 13.

The system controller 13 generates a voltage control signal Cv(L), Cv(H) as the power source control signal. The voltage control signals Cv(L) and Cv(H) serve to control the voltages of the signals Vsource(1) to Vsource(n) output from the power source driver 15 to VL and VH, respectively.

It is assumed that the cathode voltage Vcath of the organic EL device 111 is set to 0 V and the voltage VL is set to 0 V too according to the embodiment. It is assumed that the voltage VH is set to +15 V.

The system controller 13 supplies the voltage control signal Cv(L) to the power source driver 15 in correction mode and write mode, and supplies the voltage control signal Cv(H) to the power source driver 15 in emission mode.

The data driver 16 acquires the potentials Vs of the data lines Ld(1) to Ld(m) when the current i_sink(id1), i_sink (id2), i_sink(id3) is drawn, and applies the voltage signals Sv(1) to Sv(m) to the data lines Ld(1) to Ld(m), respectively.

Figure 5:
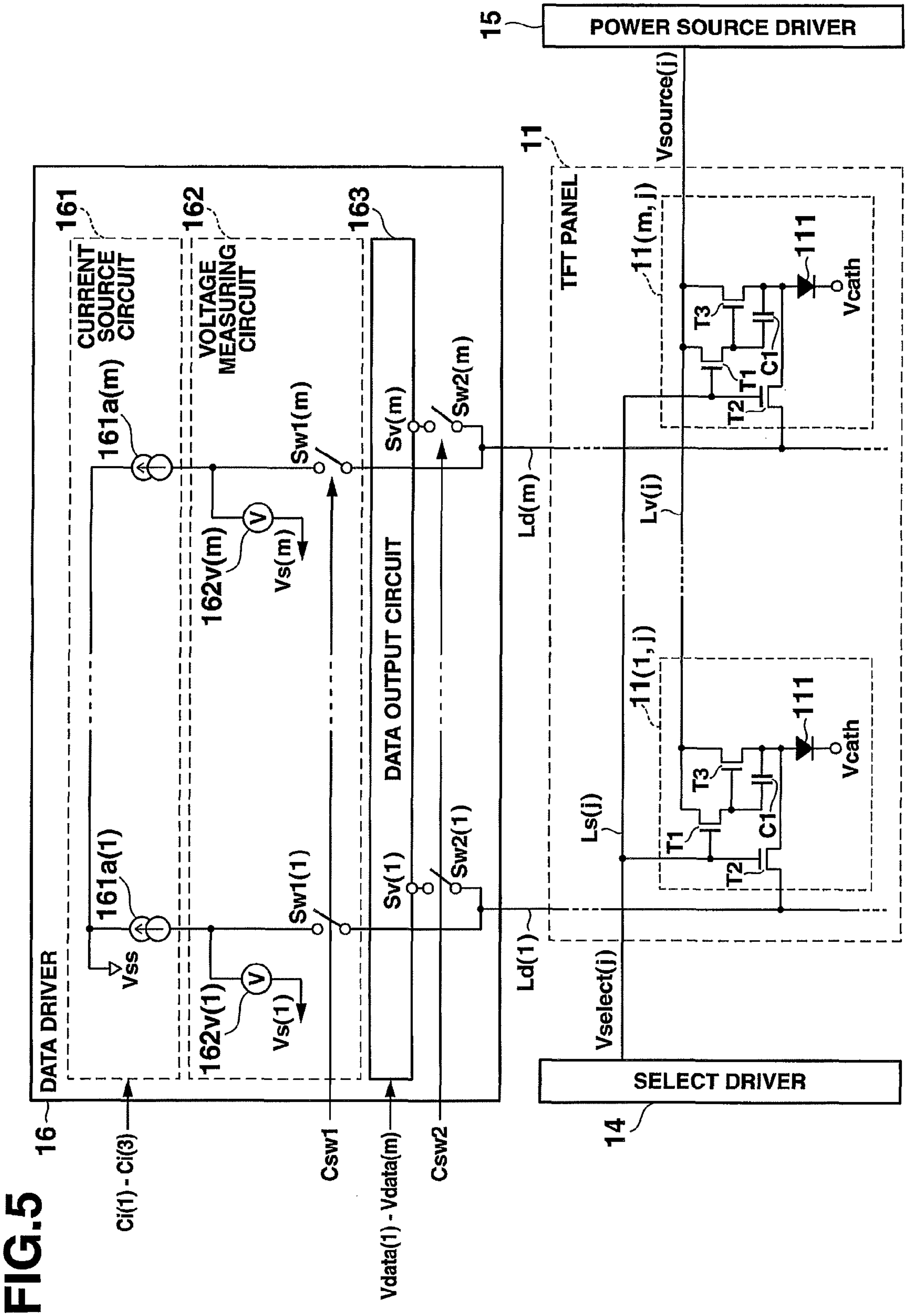
FIG. 5 is a diagram showing the configuration of a data driver shown in FIG. 1.

FIG. 5 is a diagram showing the configuration of the data driver 16 shown in FIG. 1.

As shown in FIG. 5, the data driver 16 includes a current source circuit 161, a voltage measuring circuit 162, a data output circuit 163, and switches Sw1(*i*) and Sw2(*i*).

The current source circuit 161 has current sources 161*a*(1) to 161*a*(m) respectively corresponding to the data lines Ld(1) to Ld(m). The current source 161*a*(i) (i=i to m) draws the current i_sink from the data line Ld(i).

The current downstream end of the current source 161*a*(i) is set to a potential Vss. According to the embodiment, the potential Vss is set to the same potential as that of the cathode voltage Vcath (=0 V) of the organic EL device 111.

The system controller 13 generates a current control signal Ci(1), Ci(2), Ci(3) as a data driver control signal, and supplies the current control signal to the data driver 16 to control the correction process.

The current control signals Ci(1), Ci(2) and Ci(3) are signals for controlling the drawing of the currents i_sink(id1), i_sink(id2), i_sink(id3) in the current source circuit 161 of the data driver 16, respectively.

In controlling the correction process at the time of factory shipment or the like, for example, the system controller 13 supplies the current control signals Ci(1), Ci(2) to the data driver 16. In controlling the correction process in actual use where a video signal is externally supplied, or at a regular timing or the like, the system controller 13 supplies the current control signal Ci(3) to the data driver 16.

When supplied with the current control signal Ci(1), Ci(2), Ci(3) from the system controller 13, the current source 161*a* (i) executes an operation of drawing the current i_sink(id1), i_sink(id2), i_sink(id3), respectively.

The voltage measuring circuit 162 has voltmeters 162*v*(1) to 162*v*(m) respectively corresponding to the data lines Ld(1) to Ld(m).

Each voltmeter 162*v*(i) (i=1 to m) is connected to one end of each data line Ld(i) via the switch Sw1(*i*) to measure the potential Vs(i) at one end of each data line Ld(i). One end of each voltmeter 162*v*(i) is connected to the current upstream end of the current source 161*a*(i).

Each voltmeter 162*v*(i), which is comprised of, for example, an ADC (Analog-Digital Converter), measures an analog potential Vs(i) at one end of each data line Ld(i), converts the potential to a digital potential Vs(i) to be output to the system controller 13.

The current source circuit 161 and voltage measuring circuit 162 constitute the data acquisition circuit according to the invention.

The data output circuit 163 outputs the voltage signal (drive signal) Sv(i) of an analog voltage corresponding to the gradation signal Vdata(i) to one end of the data line Ld(i) to write the voltage of the voltage signal Sv(i) into the capacitor C1 connected between the gate and source of the transistor T3 of the pixel 11(*i,j*). The voltage of the voltage signal Sv(i) corresponds to the gate voltage Vgs of the transistor T3 of the pixel 11(*i,j*).

The data output circuit 163 having, for example, a DAC (Digital-Analog Converter) is supplied with the digital gradation signal Vdata(i) (i=1 to m) from the system controller 13. The data output circuit 163 converts the supplied gradation signal Vdata(i) to an analog voltage signal Sv(i) to be output to the data line Ld(i).

The data output circuit 163 is configured to output an analog voltage signal having a voltage corresponding to the gradation signal to one end of the data line as a drive signal, which is not restrictive. The data output circuit 163 may output an analog current having a current value corresponding to the gradation signal to one end of the data line as a drive signal.

The switches Sw1(1) to Sw1(*m*) respectively serve to connect or disconnect the current source 161*a*(1) to or from one end of the data line Ld(1), . . . , and the current source 161*a*(m) to or from one end of the data line Ld(m).

The switch Sw1(*i*) has one end connected to the current upstream end of the current source 161*a*(i), and the other end connected to one end of the data line Ld(i).

The system controller 13 generates a switch control signal Csw1(close) or Csw1(open) as the data driver control signal, and supplies the switch control signal Csw1(close) or Csw1 (open) to the data driver 16 to control the opening/closing of the switch Sw1(*i*).

When supplied with the switch control signal Csw1(close) from the system controller 13, the switch Sw1(*i*) is closed to connect each current source 163*a*(i) to one end of the data line Ld(i).

When supplied with the switch control signal Csw1(open) from the system controller 13, the switch Sw1(*i*) is opened to disconnect each current source 163*a*(i) from one end of the data line Ld(i).

The switches Sw2(1) to Sw2(*m*) respectively serve to connect or disconnect the output terminal of the data output circuit 163 to or from one ends of the data lines Ld(1) to Ld(m).

The system controller 13 generates a switch control signal Csw2(close) or Csw2(open) as the control signal, and supplies the switch control signal Csw2(close) or Csw2(open) to the data driver 16 to control the opening/closing of the switch Sw2(*i*) (i=1 to m).

When supplied with the switch control signal Csw2(close) from the system controller 13, the switch Sw2(*i*) is closed to connect the output terminal of the data output circuit 163 to one end of the data line Ld(i).

When supplied with the switch control signal Csw2(open) from the system controller 13, the switch Sw2(*i*) is opened to disconnect the output terminal of the data output circuit 163 from one end of the data line Ld(i).

The operation of the display apparatus 1 according to the embodiment will be described below.

Figure 6:
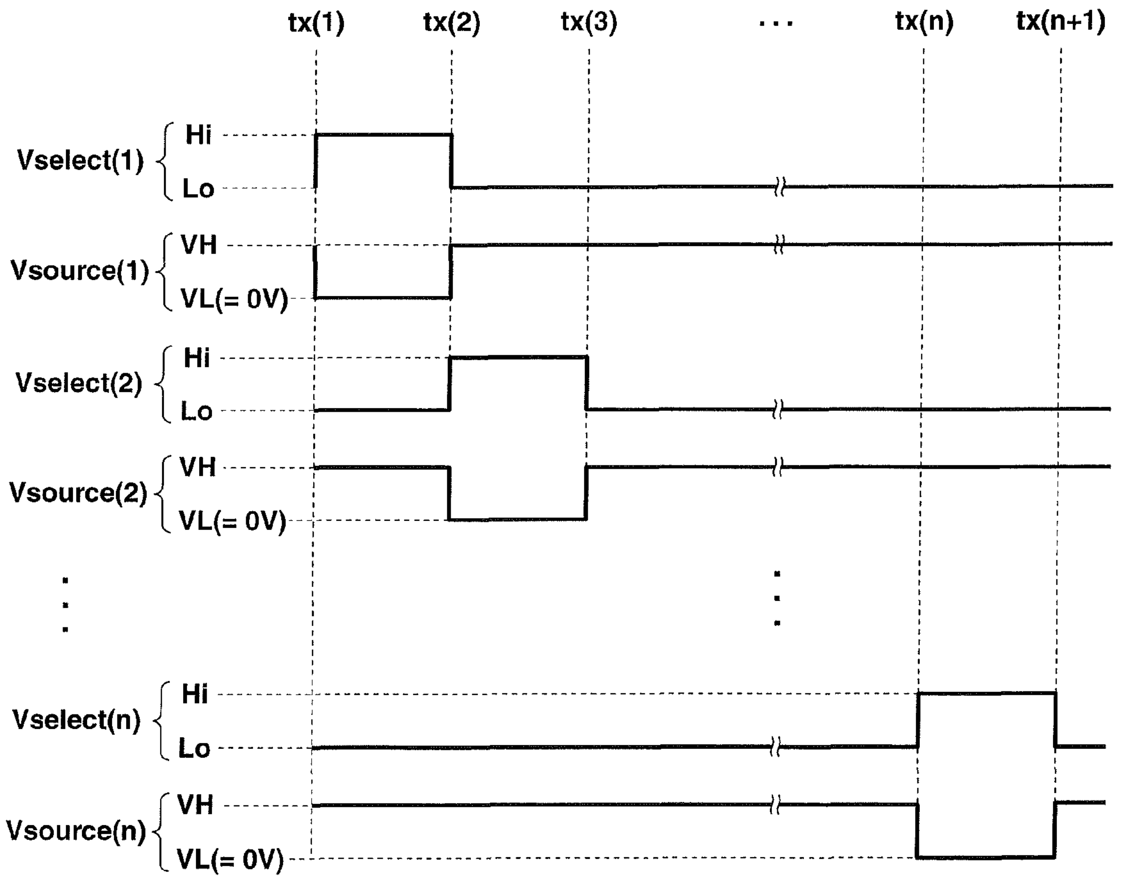
FIG. 6 is a timing chart illustrating the operation of the display apparatus shown in FIG. 1.

FIG. 6 is a timing chart illustrating the operation of the display apparatus 1 shown in FIG. 1.

Figure 7:
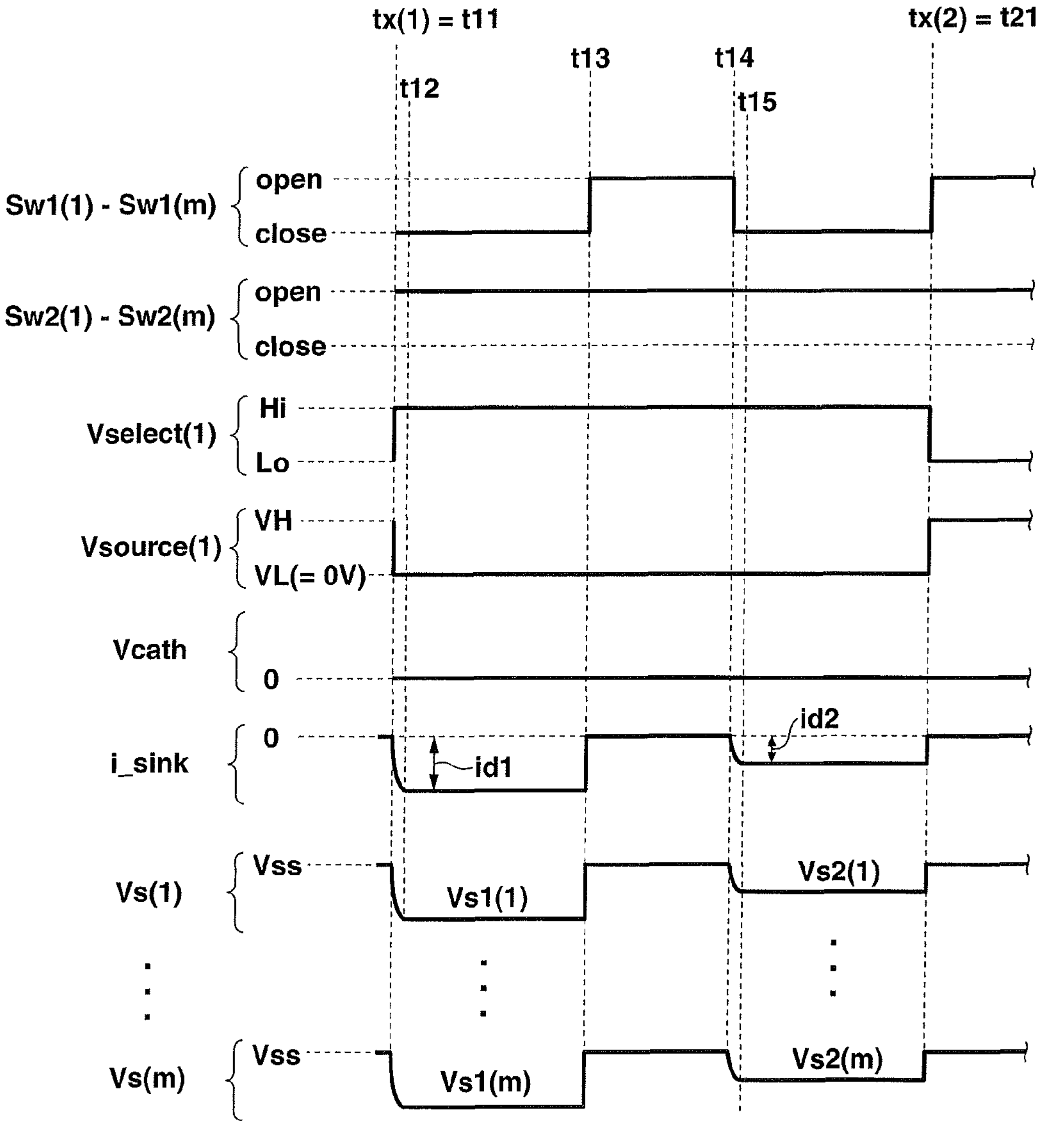

FIG. 7 is a timing chart illustrating the measuring operation which is executed at the time of factory shipment or the like.

Figure 8:
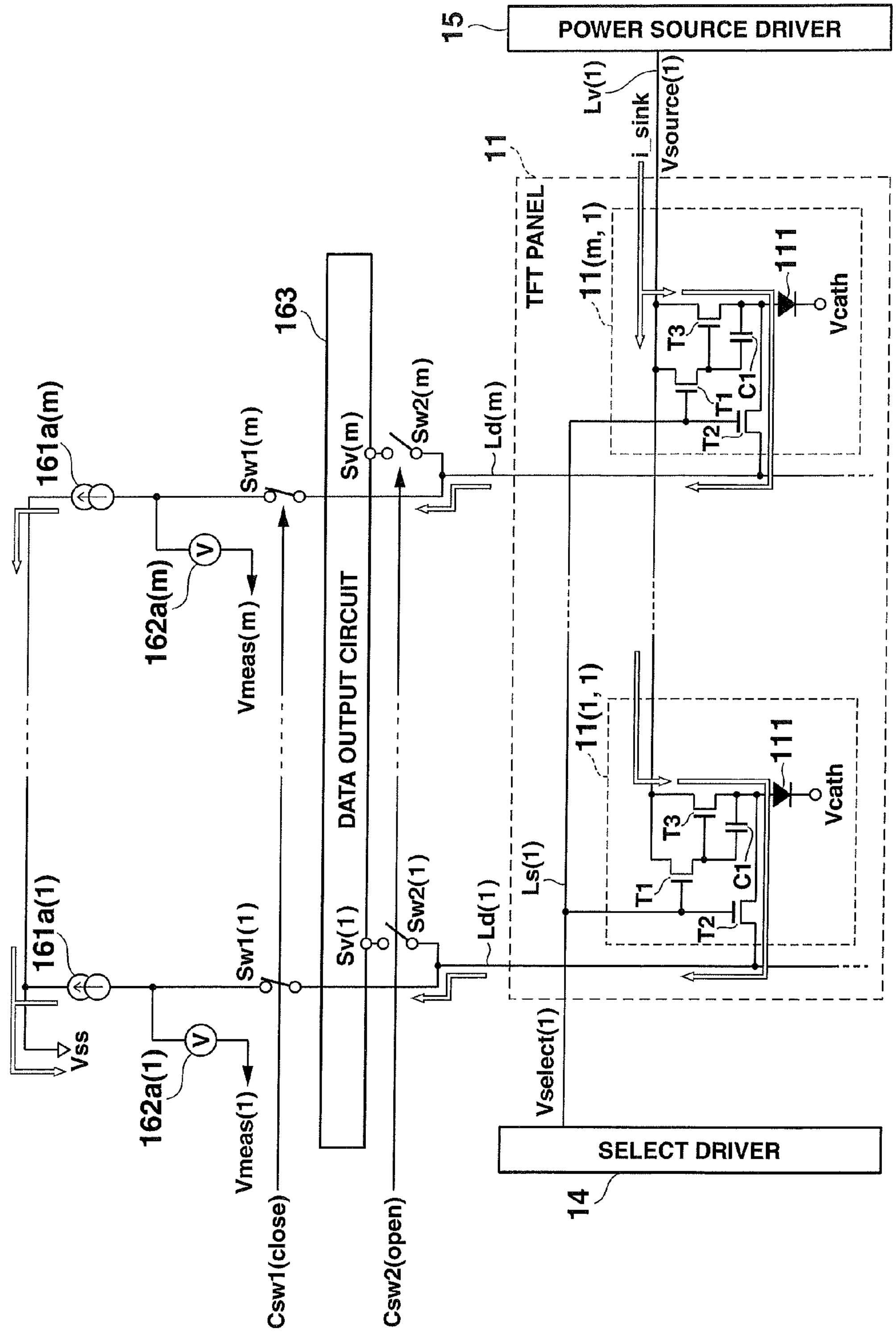

FIG. 8 is a diagram illustrating the flows of currents in the measuring operation which is executed at the time of factory shipment or the like.

To begin with, a description will be given of the operation of acquiring the threshold voltage Vth and the current amplification factor β which is executed at the time of factory shipment or the like before actual use. In this operation, the display apparatus 1 executes the aforementioned voltage measurement twice.

To measure voltages, the system controller 13 outputs the start signal Sp, the clock signal CLK, etc. to the select driver 14, the power source driver 15 and the data driver 16.

The system controller 13 also supplies the voltage control signal Cv(L) to the power source driver 15.

The select driver 14, the power source driver 15 and the data driver 16 operate at the timings according to the start signal Sp and the clock signal CLK supplied from the system controller 13.

As shown in FIG. 6, the select driver 14 outputs the Hi level select signals Vselect(1), Vselect(2), . . . , Vselect(n) to the respective select lines Ls(1), Ls(2), . . . , Ls(n) at times tx(1) to tx(2), times tx(2) to tx(3), . . . , and times tx(n) to tx(n+1), respectively.

As shown in FIG. 6, the power source driver 15 outputs the signals Vsource(1), Vsource(2), . . . , Vsource(n) of the voltage VL (=0 V) to the respective voltage lines Lv(1) to Lv(n) at the times tx(1) to tx(2), times tx(2) to tx(3), . . . , and times tx(n) to tx(n+1), respectively. Each time is preset according to the clock signal CLK.

As shown in FIG. 7, when the select driver 14 outputs the Hi level select signal Vselect(1) to the select line Ls(1) at times t11 to t21 with the time tx(1)=t11 and time tx(2)=t21, the transistors T1, T2 of the pixels 11(1,1) to 11(*m*,1) are turned on. As a result, the transistor T3 is turned on.

Although the transistor T3 is on at this time, the voltage of the voltage line Lv(1) is VL=0 V and the cathode voltage of the organic EL device 111 is Vcath=0 V, so that the current does not flow to the organic EL device 111.

At this time, the system controller 13 supplies the current control signal Ci(1) and the switch control signals Csw1 (close) and Csw2(open) to the data driver 16.

As shown in FIG. 8, the switches Sw2(1) to Sw2(*m*) of the data driver 16 are opened in response to the switch control signal Csw2(open) supplied. This disconnects the data output circuit 163 from the TFT panel 11.

The switches Sw1(1) to Sw1(*m*) are closed in response to the switch control signal Csw1(close) supplied. This connects the current source 161*a*(1) to the data line Ld(1), . . . , the current source 161*a*(m) to the data line Ld(m).

When supplied with the current control signal Ci(1) from the system controller 13, the each of current sources 161*a*(1) to 161*a*(m) draws the current i_sink(id1).

As each of the current sources 161*a*(1) to 161*a*(m) draws the current i_sink(id1), the current i_sink(id1) flows to the current sources 161*a*(1) to 161*a*(m) from the power source driver 15 via the voltage line Lv(1), the transistors T3, T2 of the individual pixels 11(1,1) to 11(*m*,1), and the data lines Ld(1) to Ld(m).

Next, when the source potentials Vs(1) to Vs(m) become stable at the time t12, as shown in FIG. 7, the voltmeters 162*v*(1) to 162*v*(m) measure the potentials Vs(1) to Vs(m) of the data lines Ld(1) to Ld(m), respectively. Then, the measured potentials Vs(1) to Vs(m) are output to the system controller 13.

When supplied with the potentials Vs(1) to Vs(m) from the data driver 16, the correction control circuit 133 instructs the correction operation circuit 132 to perform the correction operation.

In response to the instruction, the correction operation circuit 132 acquires differential voltages V1(1) to V1(*m*) between the potentials Vs(1) to Vs(m) and the voltage VL (=0 V) of the signal Vsource(j), and treats each differential voltage as a voltage applied between the drain and source of the transistor T3 of each of the pixels 11(1,1) to 11(*m*,1) of the first row.

The correction operation circuit 132 stores the current value id1 and the voltages V1(1) to V1(*m*) into the correction data storage circuit 131.

Thereafter, the system controller 13 outputs the switch control signal Csw1(open) to the data driver 16 at the time t13.

The switches Sw1(1) to Sw1(*m*) of the data driver 16 are opened in response to the switch control signal Csw1(open) supplied. This disconnects the current source 161*a*(1) from the data line Ld(1), . . . , the current source 161*a*(m) from the data line Ld(m), inhibiting the current i_sink(id1) to flow.

Next, the system controller 13 outputs the current control signal Ci(2) and the switch control signal Csw1(close) to the data driver 16 at the time t14.

The switches Sw1(1) to Sw1(*m*) are closed in response to the switch control signal Csw1(close) supplied from the system controller 13. This connects the current source 161*a*(1) to the data line Ld(1), . . . , the current source 161*a*(m) to the data line Ld(m).

When supplied with the current control signal Ci(2) from the system controller 13, the current sources 161*a*(1) to 161*a*(m) switches the current i_sink(id1) to the current i_sink(id2).

As the current sources 161*a*(1) to 161*a*(m) draw the current i_sink(id2), as shown in FIG. 8, the current i_sink(id2) flows to the current sources 161*a*(1) to 161*a*(m) from the power source driver 15 via the voltage line Lv(1), the transistors T3, T2 of the individual pixels 11(1,1) to 11(*m*,1), and the data lines Ld(1) to Ld(m).

Next, when the potentials Vs(1) to Vs(m) become stable at the time t15, as shown in FIG. 7, the voltmeters 162*v*(1) to 162*v*(m) measure the potentials Vs(1) to Vs(m) of the data lines Ld(1) to Ld(m), respectively. Then, the measured potentials Vs(1) to Vs(m) are output to the system controller 13.

When supplied with the potentials Vs(1) to Vs(m) from the data driver 16, the correction control circuit 133 instructs the correction operation circuit 132 to perform the correction operation.

In response to the instruction, the correction operation circuit 132 acquires differential voltages V2(1) to V2(*m*) between the potentials Vs(1) to Vs(m) and the voltage VL (=0 V) of the signal Vsource(j), and treats each differential voltage as a voltage applied between the drain and source of the transistor T3 of each of the pixels 11(1,1) to 11(*m*,1) of the first row.

The correction operation circuit 132 stores the current value id2 and the voltages V2(1) to V2(*m*) into the correction data storage circuit 131.

The correction operation circuit 132 sequentially reads the current values id1, id2 and the voltages V1(1) to V1(*m*), V2(1) to V2(*m*) from the correction data storage circuit 131 for each pixel 11(*i*,1), and assigns them into the equations 2 and 3 to acquire β and the threshold voltage Vth.

The correction operation circuit 132 stores the acquired β and the threshold voltage Vth of each of the pixels 11(1,1) to 11(*m*,1) into the correction data storage circuit 131.

When the select driver 14 outputs the signal Vselect(1) of the level Lo to the select line Ls(1) at the time t21, the transistors T1, T2 of each of the pixels 11(1,1) to 11(*m*,1) are turned off. As a result, the transistor T3 is turned off.

Likewise, the data driver 16 sequentially measures the potentials Vs(1) to Vs(m) of the data lines Ld(1) to Ld(m), which correspond to the source potentials of the transistors T3 of the pixels 11(1,2) to 11(*m*,2) of the second row, . . . , the pixels 11(1,*n*) to 11(*m*,*n*) of the nth row twice at the times tx(2) to tx(3), . . . , the times tx(n) to tx(n+1) shown in FIG. 6. Then, the data driver 16 outputs the measured potentials Vs(1) to Vs(m) to the system controller 13.

Then, the correction operation circuit 132 sequentially acquires the current amplification factor β and the threshold voltage Vth of each of the pixels 11(1,2) to 11(*m*,2) of the second row, . . . , the pixels 11(1,*n*) to 11(*m*,*n*) of the nth row. The correction operation circuit 132 then stores the acquired β and threshold voltage Vth into the correction data storage circuit 131 in association with each pixel 11(*i*,*j*).

Next, a description will be given of the operation of acquiring the threshold voltage Vth which is executed by the display apparatus 1 at the time of usage after the factory shipment. This operation is carried out every time the display apparatus 1 is activated or displays a video image, or at a regular timing or the like.

Figure 9:
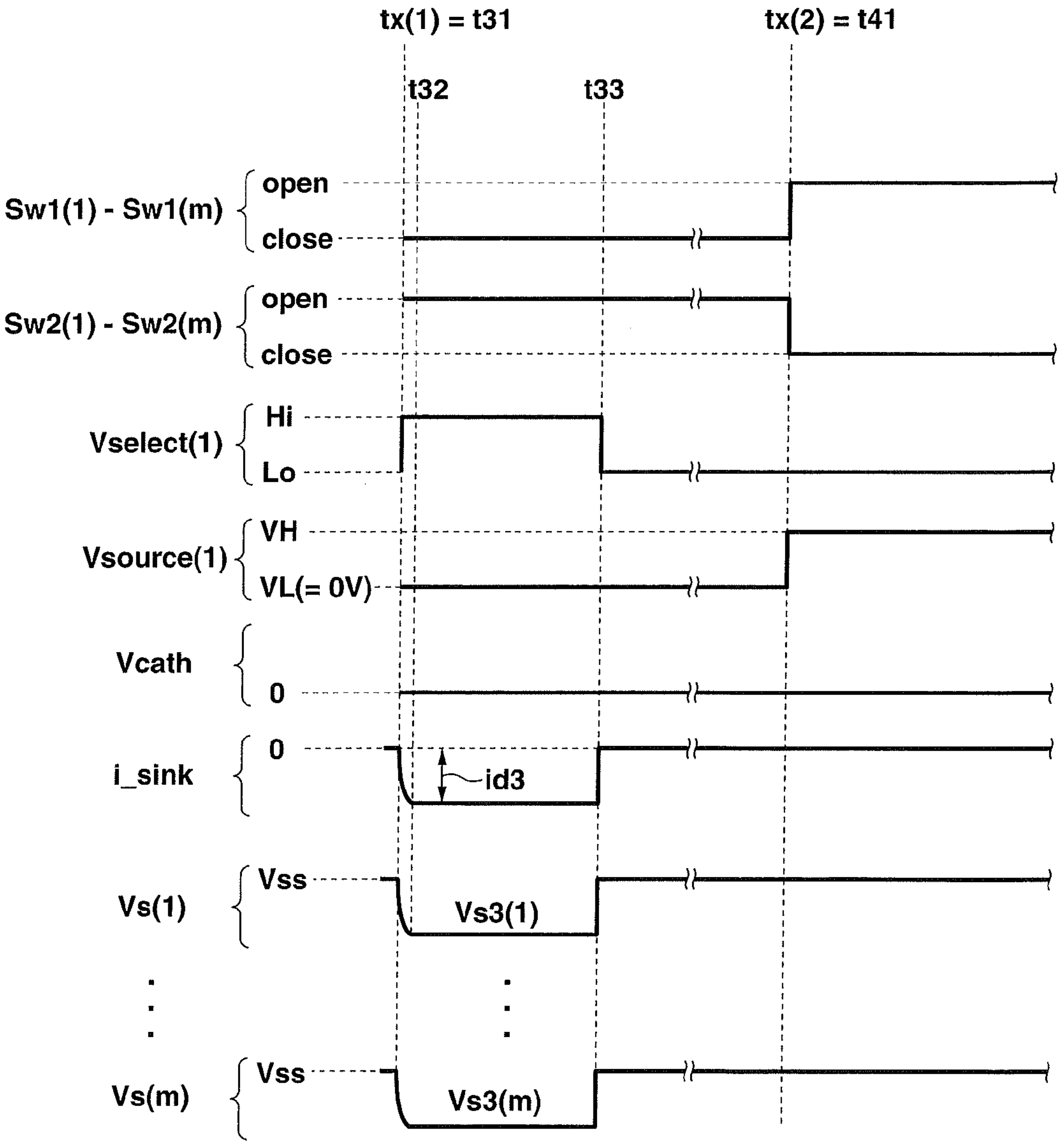
FIG. 9 is a timing chart illustrating a measuring operation which is executed in actual use.

FIG. 9 is a timing chart illustrating the measuring operation which is executed in actual use.

In this operation, the system controller 13 executes voltage measurement only once. In executing the voltage measurement, the system controller 13 outputs the start signal Sp, the clock signal CLK, etc. to the power source driver 15 and the data driver 16.

The system controller 13 also supplies the voltage control signal Cv(L) to the power source driver 15.

As shown in FIG. 6, the select driver 14 outputs the Hi level signals Vselect(1), Vselect(2), . . . , Vselect(n) to the respective select lines Ls(1), Ls(2), . . . , Ls(n) at the times tx(1) to tx(2), times tx(2) to tx(3), . . . , and times tx(n) to tx(n+1), respectively.

The power source driver 15 outputs the signals Vsource(1), Vsource(2), . . . , Vsource(n) of the voltage VL (=0 V) to the respective voltage lines Lv(1) to Lv(n) at the times tx(1) to tx(2), times tx(2) to tx(3), . . . , and times tx(n) to tx(n+1), respectively.

As shown in FIG. 9, the system controller 13 supplies the current control signal Ci(3) and the switch control signals Csw1(close) and Csw2(open) to the data driver 16 at times t31 too t41 with the time tx(1)=t31 and tx(2)=t41.

The switches Sw2(1) to Sw2(*m*) of the data driver 16 are opened in response to the switch control signal Csw2(open) supplied. This disconnects the data output circuit 163 from the TFT panel 11.

The switches Sw1(1) to Sw1(*m*) are closed in response to the switch control signal Csw1(close) supplied. This connects the current source 161*a*(1) to the data line Ld(1), . . . , the current source 161*a*(m) to the data line Ld(m).

When supplied with the current control signal Ci(3) from the system controller 13, each of the current sources 161*a*(1) to 161*a*(m) draws the current i_sink(id3).

Next, when the source potentials Vs(1) to Vs(m) become stable at the time t32, the voltmeters 162*v*(1) to 162*v*(m) measure the potentials Vs(1) to Vs(m) of the data lines Ld(1) to Ld(m), respectively. Then, the measured potentials Vs(1) to Vs(m) are output to the system controller 13.

When supplied with the potentials Vs(1) to Vs(m) from the data driver 16, the correction control circuit 133 instructs the correction operation circuit 132 to perform the correction operation.

In response to the instruction, the correction operation circuit 132 acquires voltages V3(1) to V3(*m*) applied to the transistors T3 of the pixels 11(1,1) to 11(*m*,1) of the first row based on the differences between the potentials Vs(1) to Vs(m) and the voltage VL (=0 V) of the signal Vsource(j).

The correction operation circuit 132 stores the current value id3 and the voltages V3(1) to V3(*m*) into the correction data storage circuit 131.

The correction operation circuit 132 sequentially reads the current value id3 and the voltage V3 of each of the pixels 11(1,1) to 11(*m*,1) of the first row from the correction data storage circuit 131, and assigns them into the equation 7 to acquire the threshold voltage Vth.

The correction operation circuit 132 stores the acquired threshold voltage Vth into the correction data storage circuit 131 for each of the pixels 11(1,1) to 11(*m*,1). The threshold voltage Vth of each pixel 11(*i,j*) which has been acquired and stored in the correction data storage circuit 131 at the time of the factory shipment or the like is updated to the threshold voltage Vth acquired in actual use.

Next, a description will be given of the operation when the video signal Image is externally supplied to the display apparatus 1 and image information according to the video signal Image is displayed on the TFT panel 11.

Figure 10:
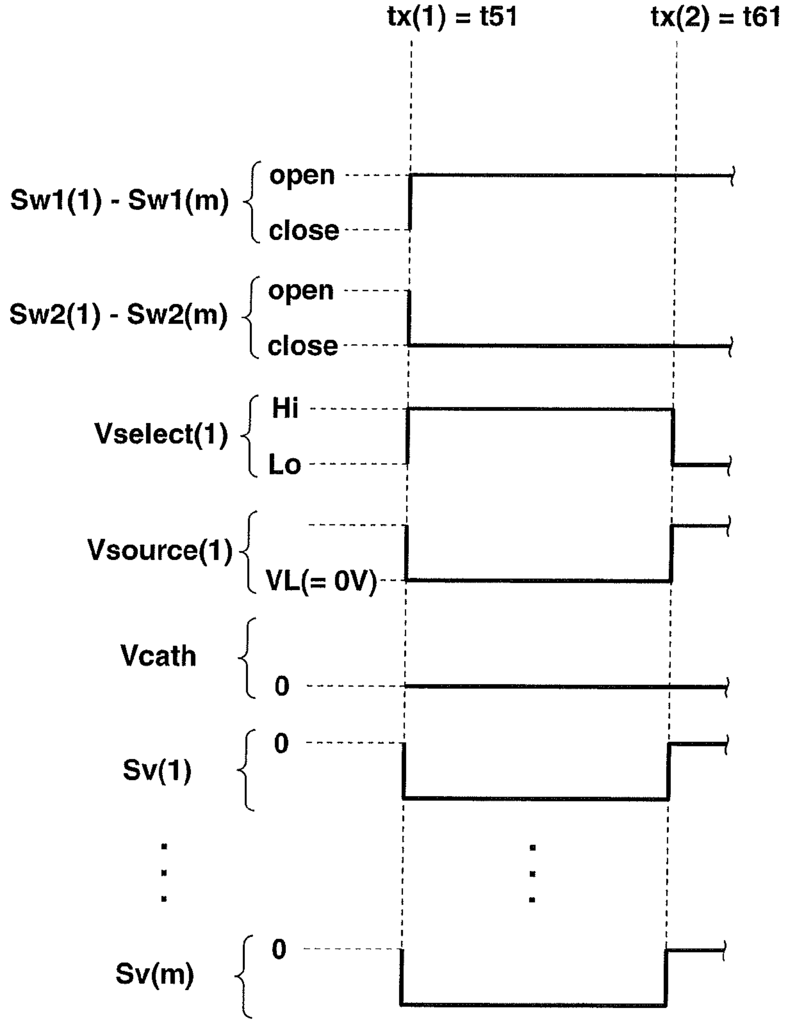
FIG. 10 is a timing chart illustrating the operation in write mode.

FIG. 10 is a timing chart illustrating the operation in write mode.

Figure 11:
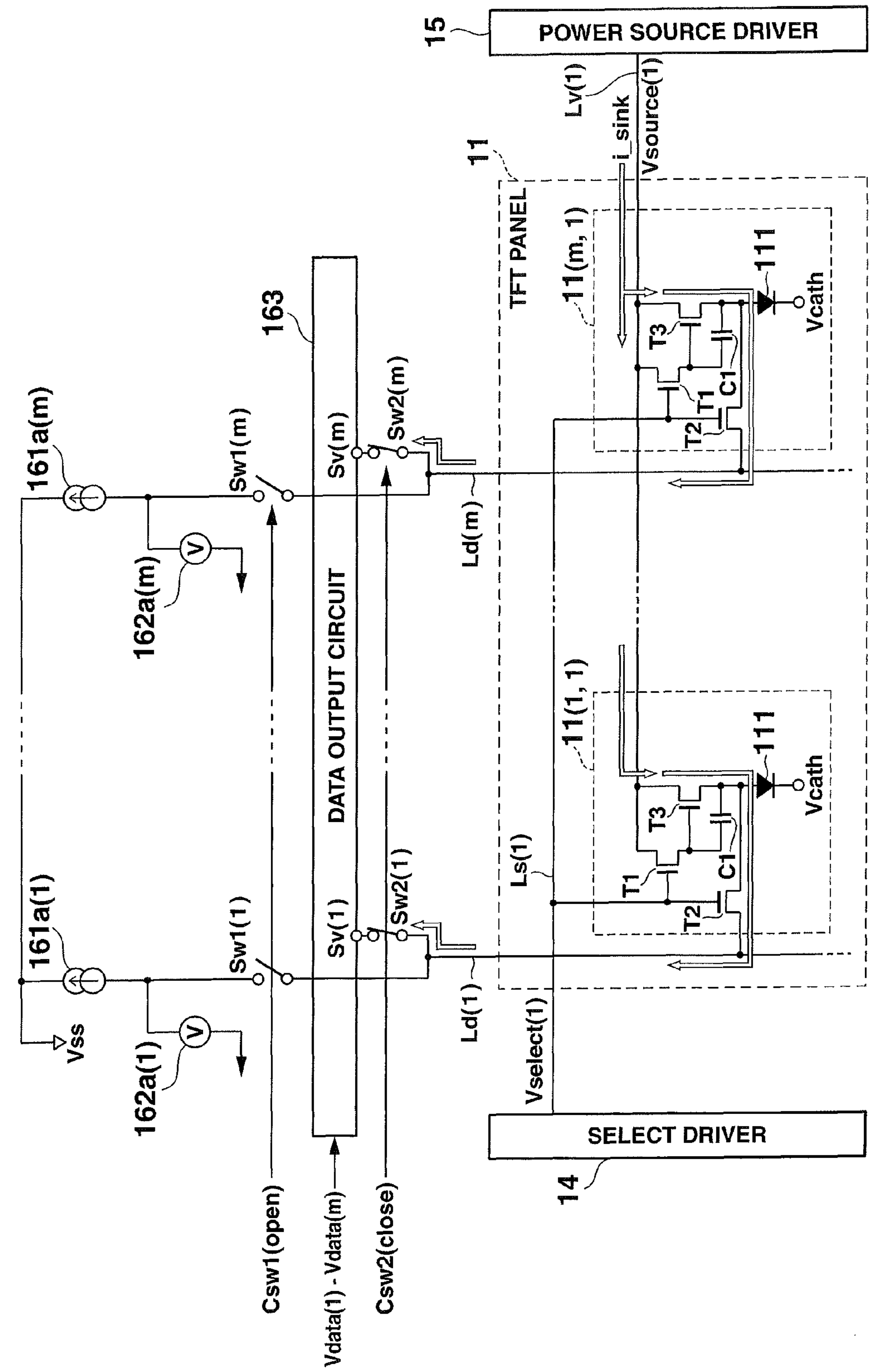
FIG. 11 is a diagram illustrating the flows of currents in write mode.

FIG. 11 is a diagram illustrating the flows of currents in write mode.

Figure 12:
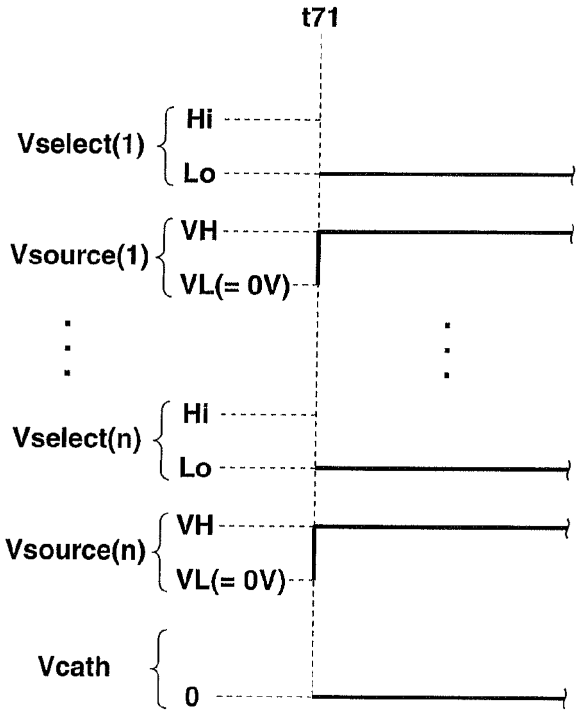
FIG. 12 is a timing chart illustrating the operation in emission mode.

FIG. 12 is a timing chart illustrating the operation in emission mode.

At this time, the display signal generating circuit 12 acquires the display data Pic and the sync signal Sync from the supplied video signal Image, and supplies them to the system controller 13. Then, the system controller 13 stores the display data Pic supplied from the display signal generating circuit 12 into the correction data storage circuit 131 for each pixel 11(*i,j*).

The correction operation circuit 132 reads data relating to the equation 7 from the correction data storage circuit 131, and assigns the read threshold voltage Vth, β and display data Pic into the equation 7 to generate and output the gradation signal Vdata(i) corresponding to each pixel 11(*i,j*).

As shown in FIG. 10, the select driver 14 outputs the Hi level select signal Vselect(1) to the select line Ls(1) at times t51 with the time tx(1)=t51 and time tx(2)=t61. As a result, the transistors T1, T2 of the pixels 11(1,1) to 11(*m*,1) are turned on. This turns on the transistor T3.

Because the potential at the cathode of the organic EL device 111 is 0 V, the current does not flow to the organic EL device 111 even when the power source driver 15 outputs the signal Vsource(1) of 0 V to the voltage line Lv(1).

Then, the system controller 13 supplies the switch control signals Csw1(open) and Csw2(close) to the data driver 16.

The switches Sw1(1) to Sw1(*m*) are opened in response to the switch control signal Csw1(open) supplied from the system controller 13. The switches Sw2(1) to Sw2(*m*) are closed in response to the switch control signal Csw2(close) supplied from the system controller 13.

When the switches Sw1(1) to Sw1(*m*) are opened, as shown in FIG. 11, the current source 161*a*(1), . . . , the current source 161*a*(m) are disconnected from the data line Ld(1), . . . , the data line Ld(m).

When the switches Sw2(1) to Sw2(*m*) are closed, the TFT panel 11 is connected to the data output circuit 163.

The system controller 13 outputs the gradation signals Vdata(1) to Vdata(m) of the first row to the data driver 16 from the correction operation circuit 132. The data output circuit 163 of the data driver 16 converts the digital gradation signals Vdata(1) to Vdata(m) supplied from the system controller 13 to analog voltage signals Sv(1) to Sv(m) to be output onto the data lines Ld(1) to Ld(m), respectively.

When the data output circuit 163 outputs the voltage signals Sv(1) to Sv(m) to the data lines Ld(1) to Ld(m), the current i_sink flows into the data output circuit 163 from the power source driver 15 via the pixels 11(1,1) to 11(*m*,1) and the switches Sw2(1) to Sw2(*m*) as indicated by arrows in FIG. 11.

The flow of the current i_sink causes the capacitors C1 of the pixels 11(1,1) to 11(*m*,1) to be charged with the voltages of the voltage signals Sv(1) to Sv(m).

At time t61 shown in FIG. 10, the select driver 14 outputs the Lo level select signal Vselect(1) to the select line Ls(1).

When the signal level of the select line Ls(1) falls to the Lo level, the transistors T1, T2 of each of the pixels 11(1,1) to 11(*m*,1) are turned off. As a result, the transistor T3 is turned off.

At this time, the capacitors C1 of the pixels 11(1,1) to 11(*m*,1) hold the charged voltages of the voltage signals Sv(1) to Sv(m), respectively.

Likewise, at times tx(2) to tx(3), tx(n) to tx(n+1) shown in FIG. 6, the system controller 13 controls the writing operation for the pixels 11(*i,j*) of the second to nth rows as per the first row, so that the capacitors C1 hold the charged voltages of the voltage signals Sv(1) to Sv(m), respectively.

When the writing operation is completed, the system controller 13 controls the emission operation. At time t71, as shown in FIG. 12, the select driver 14 outputs the Lo level signals Vselect(1) to Vselect(n) to the select lines Ls(1) to Ls(n), respectively.

When the signal levels of the select lines Ls(1) to Ls(n) fall to the Lo level, the transistors T1, T2 of every pixel 11(*i,j*) are turned off.

The system controller 13 supplies the voltage control signal Cv(H) to the power source driver 15. As the voltage control signal Cv(H) is supplied from the system controller 13, the power source driver 15 outputs the signals Vsource(1) to Vsource(n) with the voltage VH (=+15 V) to the voltage lines Lv(1) to Lv(n).

When the voltages of the voltage lines Lv(1) to Lv(n) become VH, the transistor T3 of each pixel 11(*i,j*) supplies the organic EL device 111 with the current corresponding to the voltage held in each capacitor C1 as the gate voltage Vgs.

Then, with the current flowing through each organic EL device 111, the organic EL device 111 emits light with the luminance corresponding to the current value of the current.

According to the embodiment, as described above, the display apparatus 1 executes potential measurement on each data line according to, for example, the force current/measure voltage system twice at the time of factory shipment or the like before actual use to acquire the threshold voltage and current amplification factor.

It is therefore possible to execute correction to cope with a variation in current amplification factor β as well as correction based on the threshold voltage Vth, thus ensuring better correction according to the display characteristic. This can improve the image quality.

Because the value of the current amplification factor β is acquired at the time of factory shipment or the like, in actual use, the then threshold voltage Vth can be acquired by performing the potential measurement on each data line only once. This facilitates correction for a variation in threshold voltage Vth.

Various modes are conceivable in working out the invention which is not limited to the foregoing embodiment.

For example, the data driver 16 executes voltage measurement according to the force current/measure voltage system according to the embodiment. However, the measuring system is not limited to the force current/measure voltage system, and the data driver 16 may execute current measurement according to the force voltage/measure current system.

Figure 13:
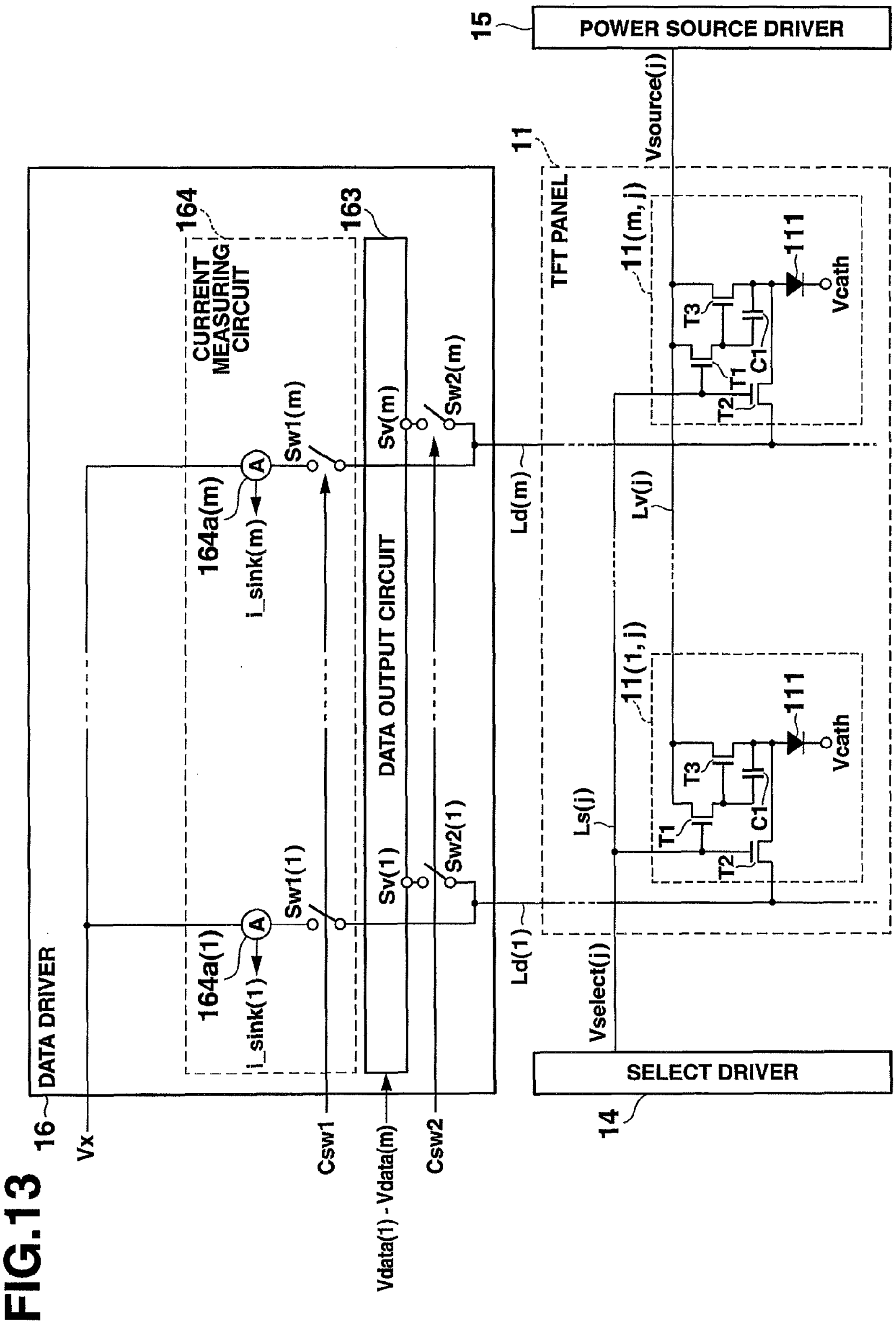
FIG. 13 is a diagram showing the configuration of a data driver based on a force voltage/measure current system as a modification.

FIG. 13 is a diagram showing the configuration of a data driver based on the force voltage/measure current system as a modification.

In this case, the data driver 16 includes a current measuring circuit 164 as shown in FIG. 13. The current measuring circuit 164 has ammeters 164*a*(1) to 164*a*(m). The ammeters 164*a*(1) to 164*a*(m) respectively measure the currents i_sink flowing in the data lines Ld(1) to Ld(m).

Then, the system controller 13 applies a preset voltage Vx to the data lines Ld(1) to Ld(m), and the ammeters 164*a*(1) to 164*a*(m) outputs the respective measured currents i_sink(1) to i_sink(m) to the system controller 13.

According to the embodiment, the voltage measurement is executed twice at the time of factory shipment. However, the voltage measurement has only to be executed multiple times which may be greater than two.

Further, the timing at which the data driver 16 executes the voltage measurement is not limited to the timing of factory shipment, and may be the timing at which, for example, the display apparatus 1 is powered up for the first time after product shipment.

Although each pixel 11(*i,j*) has an organic EL device as a light emitting device in the embodiment, the light emitting device is not restrictive. For example, the light emitting device may be of a current drive type, such as an inorganic electroluminescence (EL) device or light emitting diode (LED).

Although each pixel 11(*i,j*) is configured to have a light emitting device and three transistors T1 to T3, which is not restrictive as long as the pixel 11(*i,j*) is configured to have a drive transistor which controls the current value of the current to be supplied to the light emitting device and to allow the current to flow to the drive transistor in write mode. For example, each pixel 11(*i,j*) may be configured to include four or more transistors.

According to the embodiment, the current is drawn into the data driver 16 in write mode, which is not restrictive. the current may be allowed to flow in the direction of pushing from the data driver 16 according to the configurations of the transistors and light emitting device of each pixel 11(*i,j*).

The foregoing description of the embodiment has been given of the case where one end of the voltmeter 162*v*(i) of the voltage measuring circuit 162 is connected to the current upstream end of the current source 161*a*(i), and the source potential Vs of the transistor T3 of each pixel 11(*i,j*) is measured based on the difference between the potential Vs(i) of the data line Ld(i) and the voltage of the signal Vsource(j) to be applied to each voltage line Lv(j).

However, the other end of the voltmeter 162*v*(i) may be connected to the voltage lines Lv(1) to Lv(n), or the voltage VL of each of the signals Vsource(1) to Vsource(n) may be fixed to 0 V, so that the voltmeter 162*v*(i) directly measures the application voltages V1, V2, V3 of the transistor T3 of each pixel 11(*i,j*).

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application claims the priority of Japanese Patent Application No. 2008-251908 filed on Sep. 29, 2008, which is incorporated herein by reference in the entirety.

What is claimed is:

1. A display driving apparatus for driving, via a signal line, a pixel having a light emitting device and a drive device, a current path of the drive device having a first end connected to the light emitting device, the apparatus comprising:

a data acquisition circuit that is connected to one end of the signal line and that (i) causes, by setting one of a value of a potential at the one end of the signal line and a current value of a current to be flown to the signal line, a current to flow through the current path of the drive device and the signal line with a potential at a second end of the current path of the drive device being set so as not to cause the current to flow to the light emitting device, and (ii) acquires, in accordance with the set value, one of the current value of the current flowing to the signal line and the value of the potential at the one end of the signal line; and a correction operation circuit that acquires a threshold voltage and a current amplification factor of the drive device based on the acquired one of the current value and the value of the potential which are acquired by the data acquisition circuit and the set one of the value of the potential and the current value;

wherein acquisition of the threshold voltage and the current amplification factor by the correction operation circuit is executed once; and wherein after execution of the acquisition of the threshold voltage and the current amplification factor, acquisition of the threshold voltage based on the acquired current amplification factor by the correction operation circuit is repeatedly executed at every timing set based on a drive state of the pixel.

2. The display driving apparatus according to claim 1, wherein the correction operation circuit acquires a difference between the potential at the one end of the signal line acquired by the data acquisition circuit and the set potential at the second end of the current path of the drive device as an application voltage to be applied across the current path of the drive device, and acquires the threshold voltage and the current amplification factor based on a voltage value of the application voltage and the current value in the acquisition of the threshold voltage and the current amplification factor.

3. The display driving apparatus according to claim 2, wherein in the acquisition of the threshold voltage and the current amplification factor which is executed once, (i) the data acquisition circuit sets the current value of the current flowing through the current path of the drive device and the signal line to a plurality of different values, and acquires a corresponding one of the current value and the value of the potential at the one end of the signal line multiple times, and (ii) the correction operation circuit acquires the threshold voltage and the current amplification factor from values of a plurality of application voltages based on the plurality of current values and the plurality of values of the potentials at the one end of the signal line which are acquired by the data acquisition circuit, based on a fact that the current value of the current flowing to the current path of the drive device according to the application voltage is a value set according to the threshold voltage and the current amplification factor of the drive device as parameters.

4. The display driving apparatus according to claim 1, further comprising a correction data storage circuit that stores the threshold voltage and the current amplification factor acquired by the correction operation circuit;

wherein in the acquisition of the threshold voltage based on the acquired current amplification factor, which is repeatedly executed, (i) the data acquisition circuit executes acquisition of the current value and the value of the potential at the one end of the signal line once, and (ii) the correction operation circuit acquires the threshold voltage based on a value of the current amplification factor stored in the correction data storage circuit, and the one current value and the one value of the potential which are acquired by the data acquisition circuit, and updates a value of the threshold voltage stored in the correction data storage circuit to a value of the acquired threshold voltage every time the threshold voltage is acquired.

5. The display driving apparatus according to claim 1, wherein the data acquisition circuit includes a current source circuit having a constant current source which supplies a current with a preset current value to the signal line, and a voltage measuring circuit having a voltmeter which measures the value of the potential at the one end of the signal line, the voltage measuring circuit measuring the value of the potential at the one end of the signal line when the current with the preset current value is supplied from the current source circuit.

6. The display driving apparatus according to claim 1, wherein the data acquisition circuit includes a voltage source circuit having a constant voltage source which supplies a voltage with a preset voltage value to the one end of the signal line, and a current measuring circuit having an ammeter which measures a current value of the current flowing to the signal line, the current measuring circuit measuring the current value of the current flowing to the signal line when the voltage with the preset voltage value is supplied from the voltage source circuit.

7. A display apparatus for displaying image information, comprising:

a plurality of signal lines;

a plurality of pixels each having a light emitting device and a drive device, a current path of the drive device having a first, end connected to the light emitting device, wherein each of the pixels is connected to one of the signal lines;

a data acquisition circuit that is connected to one end, which is not connected to a pixel, of each signal line, and that (i) causes, by setting one of a value of a potential at the one end of each signal line and a current value of a current to be flown to each signal line, a current to flow through the current path of the drive device of each pixel and each signal line with a potential at a second end of the current path of the drive device of each pixel being set so as not to cause the current to flow to the light emitting device, and (ii) acquires, in accordance with the set value, one of the current value of the current flowing to each signal line and the value of the potential at the one end of the each signal line; and a correction operation circuit that acquires a threshold voltage and a current amplification factor of the drive device of each pixel based on the acquired one of the current value and the value of the potential which are acquired by the data acquisition circuit and the set one of the value of the potential and the current value;

wherein acquisition of the threshold voltage and the current amplification factor of each pixel by the correction operation circuit is executed once; and wherein after execution of the acquisition of the threshold voltage and the current amplification factor of each pixel, acquisition of the threshold voltage of each pixel based on the acquired current amplification factor by the correction operation circuit is repeatedly executed at every timing set based on a drive state of each pixel.

8. The display apparatus according to claim 7, wherein the correction operation circuit acquires a difference between the potential at the one end of each signal line acquired by the data acquisition circuit and the set potential at the second end of the current path of the drive device as an application voltage to be applied across the current path of the drive device, and acquires the threshold voltage and the current amplification factor based on a voltage value of the application voltage and the current value in the acquisition of the threshold voltage and the current amplification factor of each pixel.

9. The display apparatus according to claim 8, wherein in the acquisition of the threshold voltage and the current amplification factor of each pixel which is executed once, (i) the data acquisition circuit sets the current value of the current flowing through the current path of the drive device and each signal line to a plurality of different values, and acquires a corresponding one of the current value and the value of the potential at the one end of each signal line multiple times, and (ii) the correction operation circuit acquires the threshold voltage and the current amplification factor of each pixel from values of a plurality of application voltages based on the plurality of current values and the plurality of values of the potentials at the one end of each signal line which are acquired by the data acquisition circuit, based on a fact that the current value of the current flowing to the current path of the drive device according to the application voltage is a value set according to the threshold voltage and the current amplification factor of the drive device as parameters.

10. The display apparatus according to claim 7, further comprising a correction data storage circuit that stores the threshold voltage and the current amplification factor of each pixel acquired by the correction operation circuits;

wherein, in the acquisition of the threshold voltage of each pixel based on the acquired current amplification factor, which is repeatedly executed, (i) the data acquisition circuit executes acquisition of the current value and the potential at the one end of each signal line once, and (ii) the correction operation circuit acquires the threshold voltage of each pixel based on a value of the current amplification factor stored in the correction data storage circuit, and the one current value and the one value of the potential which are acquired by the data acquisition circuit, and updates a value of the threshold voltage of each pixel stored in the correction data storage circuit to a value of the acquired threshold voltage of each pixel every time the threshold voltage of each pixel is acquired.

11. The display apparatus according to claim 10, further comprising a data output circuit, wherein the correction operation circuit generates a gradation signal which is externally supplied display data corrected based on the threshold voltage and the current amplification factor of each pixel based on the value of the current amplification factor stored in the correction data storage circuit, and the data output circuit generates a drive signal corresponding to the gradation signal generated by the correction operation circuit, and applies the drive signal to the one end of each signal line.

12. The display apparatus according to claim 11, wherein the correction operation circuit sets the gradation signal to a value which permits an emission luminance of the light emitting device of each pixel corresponding to a gradation value of the display data to show a preset gamma characteristic.

13. The display apparatus according to claim 7, wherein the data acquisition circuit includes a current source circuit having a constant current source which supplies a current with a preset current value to each signal line, and a voltage measuring circuit having a voltmeter which measures the value of the potential at the one end of each signal line, the voltage measuring circuit measuring the value of the potential at the one end of each signal line when the current with the preset current value is supplied from the current source circuit.

14. The display apparatus according to claim 7, wherein the data acquisition circuit includes a voltage source circuit having a constant voltage source which supplies a voltage with a preset voltage value to the one end of each signal line, and a current measuring circuit having an ammeter which measures a current value of the current flowing to each signal line, the current measuring circuit measuring the current value of the current flowing to each signal line when the voltage with the preset voltage value is supplied from the voltage source circuit.

15. A drive control method for a display apparatus for displaying image information, the display apparatus including a plurality of signal lines, and a plurality of pixels, wherein each of the pixels has a light emitting device and a drive device, a current path of the drive device having a first end connected to the light emitting device, and wherein each of the pixels is connected to one of the signal lines, the method comprising:

a measurement value acquiring step of (i) causing, by setting one of a value of a potential at one end of each signal line and a current value of a current to be flown to each signal line, a current to flow through the current path of the drive device of each pixel and each signal line while setting a potential at a second end of the current path of the drive device of each pixel so as not to cause the current to flow to the light emitting device, and (ii) acquiring, in accordance with the set value, one of a current value of the current flowing to each signal line and the value of the potential at the one end of each signal line; and a characteristic value acquiring step of acquiring a threshold voltage and a current amplification factor of the drive device of each pixel based on the acquired one of the current value and the value of the potential and the set one of the value of the potential and the current value;

wherein the characteristic value acquiring step comprises a first characteristic value acquiring step and a second characteristic value acquiring step;

wherein the first characteristic value acquiring step is performed to acquire the threshold voltage and the current amplification factor of the drive device of each pixel only once; and wherein, after execution of the first characteristic value acquiring step, the second characteristic value acquiring step is repeatedly executed at every timing set based on a drive state of each pixel to acquire the threshold voltage of each pixel based on the current amplification factor acquired in the first characteristic value acquiring step.

16. The drive control method according to claim 15, wherein the first characteristic value acquiring step includes:

a first measuring step of setting the current value of the current flowing through the current path of the drive device and each signal line to a plurality of different values, and executing acquisition of a corresponding one of the current value and the value of the potential at the one end of each signal line multiple times;

a first computing step of acquiring, by computation, the threshold voltage and the current amplification factor of each pixel from values of a plurality of application voltages based on the plurality of current values and the plurality of values of the potentials at the one end of each signal line which are acquired in the first measuring step, based on a fact that the current value of the current flowing to the current path of the drive device according to the application voltage is a value set according to the threshold voltage and the current amplification factor of the drive device as parameters; and a storage step of storing the acquired threshold voltage and current amplification factor of each pixel in a correction data storage circuit.

17. The drive control method according to claim 16, wherein the second characteristic value acquiring step includes:

a second measuring step of executing acquisition of the current value and the value of the potential at the one end of each signal line once;

a second computing step of acquiring, by computation, the threshold voltage of each pixel based on the value of the current amplification factor stored in the correction data storage circuit, and the one current value and the one value of the potential which are acquired in the second measuring step; and an update step of updating a value of the threshold voltage of each pixel stored in the correction data storage circuit to a value of the acquired threshold voltage of each pixel every time the threshold voltage of each pixel is acquired in the second computing step.

18. A display driving apparatus for driving, via a signal line, a pixel having a light emitting device and a drive device, a current path of the drive device having a first end connected to the light emitting device, the apparatus comprising:

a data acquisition circuit that is connected to one end of the signal line and that: (i) causes, by setting one of a value of a potential at the one end of the signal line and a current value of a current to be flown to the signal line, a current to flow through the current path of the drive device and the signal line with a potential at a second end of the current path of the drive device being set so as not to cause the current to flow to the light emitting device, and (ii) acquires, in accordance with the set value, one of the current value of the current flowing to the signal line and the value of the potential at the one end of the signal line; and a correction operation circuit that acquires a threshold voltage and a current amplification factor of the drive device based on the acquired one of the current value and the value of the potential which are acquired by the data acquisition circuit and the set one of the value of the potential and the current value;

wherein the data acquisition circuit includes a voltage source circuit having a constant voltage source which supplies a voltage with a preset voltage value to the one end of the signal line, and a current measuring circuit having an ammeter which measures a current value of the current flowing to the signal line, the current measuring circuit measuring the current value of the current flowing to the signal line when the voltage with the preset voltage value is supplied from the voltage source circuit.

* * * * *